United States Patent
Pon et al.

(10) Patent No.: US 12,294,400 B2
(45) Date of Patent: May 6, 2025

(54) CONTROLLING REMOTE ANTENNA SYSTEMS

(71) Applicant: QUALCOMM Incorporated, San Diego, CA (US)

(72) Inventors: Rayman Wai Pon, Cupertino, CA (US); Liang Zhao, Saratoga, CA (US); Pranav Iyengar, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/541,621

(22) Filed: Dec. 3, 2021

(65) Prior Publication Data

US 2023/0179245 A1   Jun. 8, 2023

(51) Int. Cl.
| | |
|---|---|
| *H04B 1/18* | (2006.01) |
| *H01Q 1/22* | (2006.01) |
| *H01Q 1/32* | (2006.01) |
| *H04B 1/04* | (2006.01) |
| *H04B 7/0426* | (2017.01) |

(52) U.S. Cl.
CPC ............. *H04B 1/18* (2013.01); *H01Q 1/2291* (2013.01); *H01Q 1/3275* (2013.01); *H04B 1/04* (2013.01); *H04B 7/0426* (2013.01); *H04B 2001/0408* (2013.01)

(58) Field of Classification Search
None
See application file for complete search history.

(56) References Cited

U.S. PATENT DOCUMENTS

| | | | |
|---|---|---|---|
| 8,190,100 B2 | 5/2012 | Chou et al. | |
| 11,123,449 B1 | 9/2021 | Xue et al. | |
| 2004/0116084 A1 | 6/2004 | Ward et al. | |
| 2011/0150126 A1 | 6/2011 | Lamon et al. | |
| 2012/0293268 A1* | 11/2012 | Laurila | H03F 3/191 |
| | | | 330/302 |
| 2013/0142295 A1* | 6/2013 | Badke | H04B 1/109 |
| | | | 375/350 |
| 2014/0362209 A1 | 12/2014 | Ziegenspeck et al. | |
| 2017/0180006 A1 | 6/2017 | De Hoog et al. | |
| 2018/0042065 A1 | 2/2018 | Jackson et al. | |
| 2019/0393883 A1 | 12/2019 | Houser | |
| 2020/0033429 A1 | 1/2020 | Darnell et al. | |
| 2021/0075520 A1 | 3/2021 | Soto et al. | |

(Continued)

FOREIGN PATENT DOCUMENTS

| | | |
|---|---|---|
| EP | 3331316 A1 | 6/2018 |
| EP | 3823172 A1 | 5/2021 |

OTHER PUBLICATIONS

International Search Report and Written Opinion—PCT/US2022/046522—ISAEPO—Jan. 19, 2023.

*Primary Examiner* — Wilson Lee
(74) *Attorney, Agent, or Firm* — Thien T. Nguyen

(57) ABSTRACT

Techniques for controlling remote antenna systems. An example method of receiving radio frequency signals with a remote antenna module includes providing a first signal to a remote receiver on a conductor, receiving a control signal from the remote receiver on the conductor, wherein the control signal is a bias voltage on the conductor, and providing a second signal on the conductor in response to receiving the control signal.

15 Claims, 21 Drawing Sheets

(56) References Cited

U.S. PATENT DOCUMENTS

| | | |
|---|---|---|
| 2021/0347460 A1 | 11/2021 | Watters et al. |
| 2021/0351804 A1 | 11/2021 | Zhan et al. |
| 2021/0385621 A1* | 12/2021 | Vo .................. H04W 4/029 |
| 2022/0182085 A1* | 6/2022 | King .................. H04B 1/04 |
| 2022/0200532 A1* | 6/2022 | Agrawal ............ H03D 7/1458 |
| 2022/0247361 A1* | 8/2022 | Salameh ............ H03F 1/3205 |
| 2023/0179253 A1 | 6/2023 | Pon et al. |
| 2024/0011782 A1* | 1/2024 | Schuerman .......... G08G 1/207 |

* cited by examiner

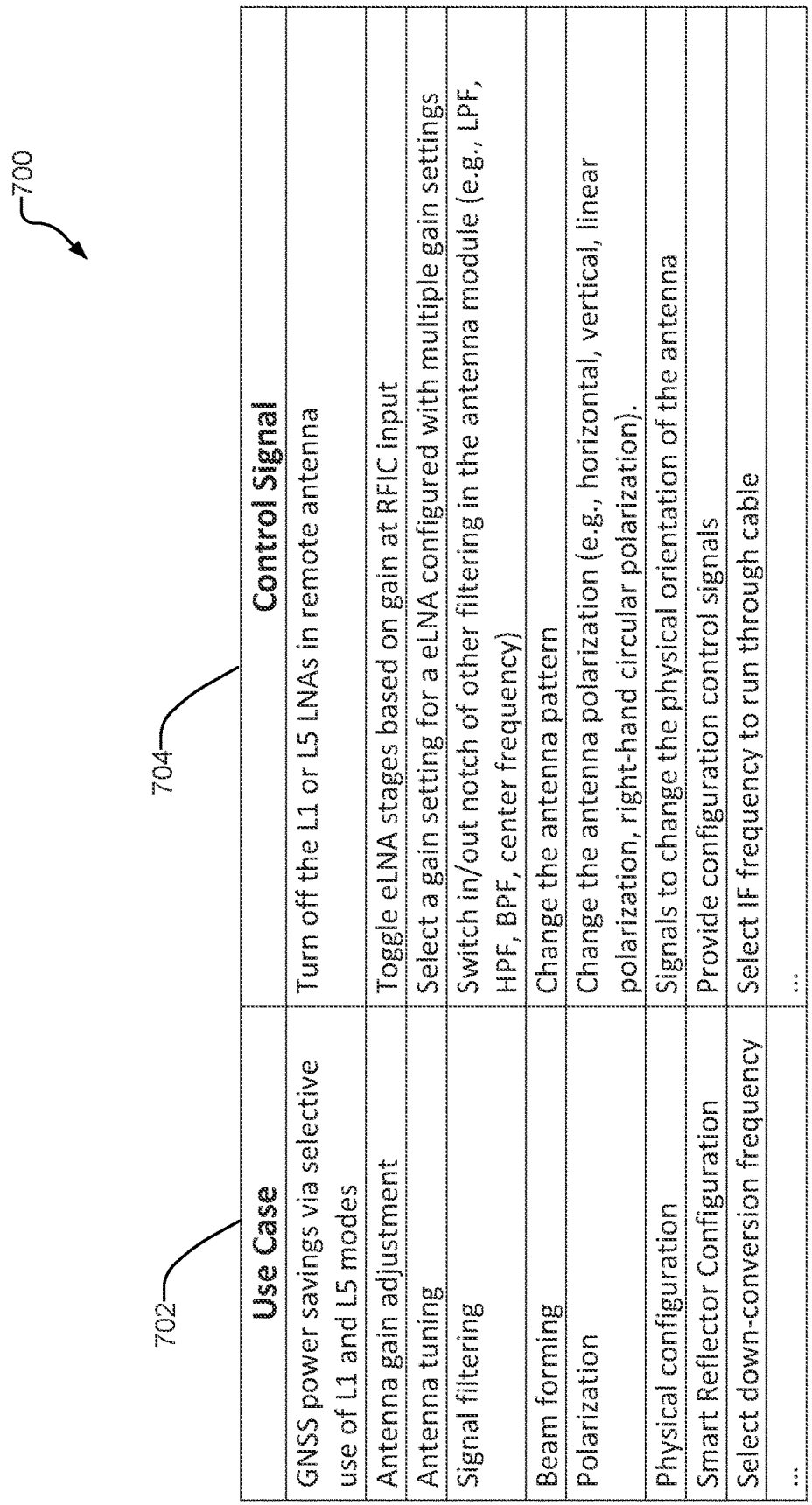

| Use Case | Control Signal |
|---|---|
| GNSS power savings via selective use of L1 and L5 modes | Turn off the L1 or L5 LNAs in remote antenna |
| Antenna gain adjustment | Toggle eLNA stages based on gain at RFIC input |
| Antenna tuning | Select a gain setting for a eLNA configured with multiple gain settings |
| Signal filtering | Switch in/out notch of other filtering in the antenna module (e.g., LPF, HPF, BPF, center frequency) |
| Beam forming | Change the antenna pattern |
| Polarization | Change the antenna polarization (e.g., horizontal, vertical, linear polarization, right-hand circular polarization). |
| Physical configuration | Signals to change the physical orientation of the antenna |
| Smart Reflector Configuration | Provide configuration control signals |
| Select down-conversion frequency | Select IF frequency to run through cable |
| ... | ... |

FIG. 7

CONTROLLING REMOTE ANTENNA SYSTEMS

BACKGROUND

Multifunction antennas for automotive applications typically include a remote antenna housing with multiple antenna elements. For example, a shark fin type antenna housing may include a multiple-input and multiple-output (MIMO) array for a wireless wide area network (WWAN), such as a cellular network, and active antennas for a satellite navigation system. The antenna housing may also include a MIMO array for 2.4/5.8 GHz WiFi communications and other wireless local area networks (WLANs). Each of the antenna arrays within the antenna housing may include one or more independent feedlines. For example, the cellular antenna array may include two coaxial cables between a transceiver and the antenna housing, the satellite navigation antenna may require one coaxial cable between a satellite navigation receiver and the antenna housing, and the WiFi antenna array may require three coaxial cables between a transceiver and the antenna housing. Other cabling may also be required to control the multifunction antenna. The number of cables installed between the respective wireless systems and the multifunction antenna housing increases the complexity of a remote antenna installation and the associated manufacturing costs. There is a need to reduce the cabling associated with remote multifunction antenna systems.

SUMMARY

An example remote antenna module according to the disclosure includes one or more antenna submodules, a controller communicatively coupled to the one or more antenna submodules, and a conductor operably coupled to the one or more antenna submodules and the controller, wherein the conductor is configured to provide radio frequency signals from the one or more antenna submodules to a remote processing unit, and receive a control signal from the remote processing unit, wherein the control signal is based on a bias voltage value on the conductor.

Implementations of such a remote antenna module may include one or more of the following features. The controller may include a plurality of comparators configured to detect the bias voltage value and a control circuit configured to provide a control signal to at least one of the one or more antenna submodules based on the bias voltage value. The controller may include an analog to digital converter circuit to detect a bias voltage value and a control circuit configured to provide a control signal to at least one of the one or more antenna submodules based on the bias voltage value. The controller may be configured to vary a state of a low noise amplifier in at least one of the one or more antenna submodules based on the control signal. The controller may be configured to vary a state of a variable tuning element in at least one of the one or more antenna submodules based on the control signal. The controller may be configured to vary a state of a radio frequency filter in at least one of the one or more antenna submodules based on the control signal. The controller may be configured to vary a beam angle of an antenna array in at least one of the one or more antenna submodules based on the control signal. The controller may be configured to vary a physical orientation of an antenna in at least one of the one or more antenna submodules based on the control signal. A modulator may be communicatively coupled to the controller and configured to modulate the radio frequency signals from the one or more antenna submodules to provide a feedback signal to the remote processing unit. The one or more antenna submodules may include at least one antenna and a filter circuit for a global navigation satellite system. The one or more antenna submodules may include at least one antenna and a radio frequency front-end associated with a wireless wide area network. The wireless wide area network may be a cellular network. The one or more antenna submodules may include at least one antenna and a radio frequency front-end associated with a wireless local area network. The wireless local area network may utilize a WiFi protocol. A multiplexer may be communicatively coupled to the one or more antenna submodules and the controller, such that the multiplexer is configured to multiplex the signals from the one or more antenna submodules and provide a synthesized signal to the remote processing unit. The conductor may be a center conductor in a coaxial cable. One or more antenna submodules may be capacitively coupled to the conductor.

An example method of receiving radio frequency signals with a remote antenna module according to the disclosure includes providing a first to a remote receiver on a conductor, receiving a control signal from the remote receiver on the conductor, wherein the control signal is a bias voltage on the conductor, and providing a second signal on the conductor in response to receiving the control signal.

Implementations of such a method may include one or more of the following features. The control signal may be configured to vary a state of a low noise amplifier, wherein the first signal is based on a first state of the low noise amplifier and the second signal is based on a second state of the low noise amplifier. The control signal may be configured to vary a state of a variable tuning element, such that the first signal is based on a first state of the variable tuning element and the second signal is based on a second state of the variable tuning element. The control signal may be configured to vary a state of a radio frequency filter, such that the first signal is based on a first state of the radio frequency filter and the second signal is based on a second state of the radio frequency filter. The control signal may be configured to vary a beam angle of an antenna array, such that the first signal is based on a first beam angle and the second signal is based on a second beam angle. The control signal may be configured to vary a physical orientation of an antenna, such that the first signal is based on a first physical orientation and the second signal is based on a second physical orientation. Feedback information may be provided on the conductor.

Items and/or techniques described herein may provide one or more of the following capabilities, as well as other capabilities not mentioned. A remote antenna module may include one or more antenna submodules and may be coupled to a processing module via a single conductor. The single conductor may be used for multiple radio frequency signals between the remote antenna module and the processing module. Control signals may also be transmitted via the single conductor. The control signals may be used to change the state of an antenna module based on different use cases. For example, the control signals may change the values of variable tuning elements, vary the gain of the radio frequency signals, and change the physical orientation of one or more antenna elements. The control signal may be based on changes in a bias voltage on the conductor. Reducing the amount of cabling between a remote antenna module and a processing module may reduce manufacturing costs. Further, it may be possible for an effect noted above to be achieved by means other than that noted, and a noted item/technique may not necessarily yield the noted effect.

BRIEF DESCRIPTION OF THE DRAWINGS

FIG. 7 is a table of example remote antenna use cases and control signals.

DETAILED DESCRIPTION

Techniques are discussed herein for controlling remote antenna systems. Many remote antennas, such as used in automotive applications, may have multiple coaxial feeds which are connected to transceivers housed within a vehicle. The coaxial feeds may include radio frequency (RF) signals (e.g., WWAN, WLAN, GNSS) from an antenna to the main transceiver circuitry. Cables providing direct current (DC) power from the main circuitry located in the vehicle may be used to power remote antenna circuitry, such as low noise amplifiers (LNAs). The techniques provided herein reduce the cabling between a remote antenna and the vehicle based circuitry to a single coaxial cable configured to convey both RF and control signals between the remote antenna to the vehicle based circuitry. In an example, low frequency signals may be multiplexed on a single conductor to control the remote antennas. In an example, DC bias voltages may be used to control the remote antenna over the single conductor. Wireless techniques and protocols may also be used to control a remote antenna. These techniques are examples, and not exhaustive.

Figure 1:
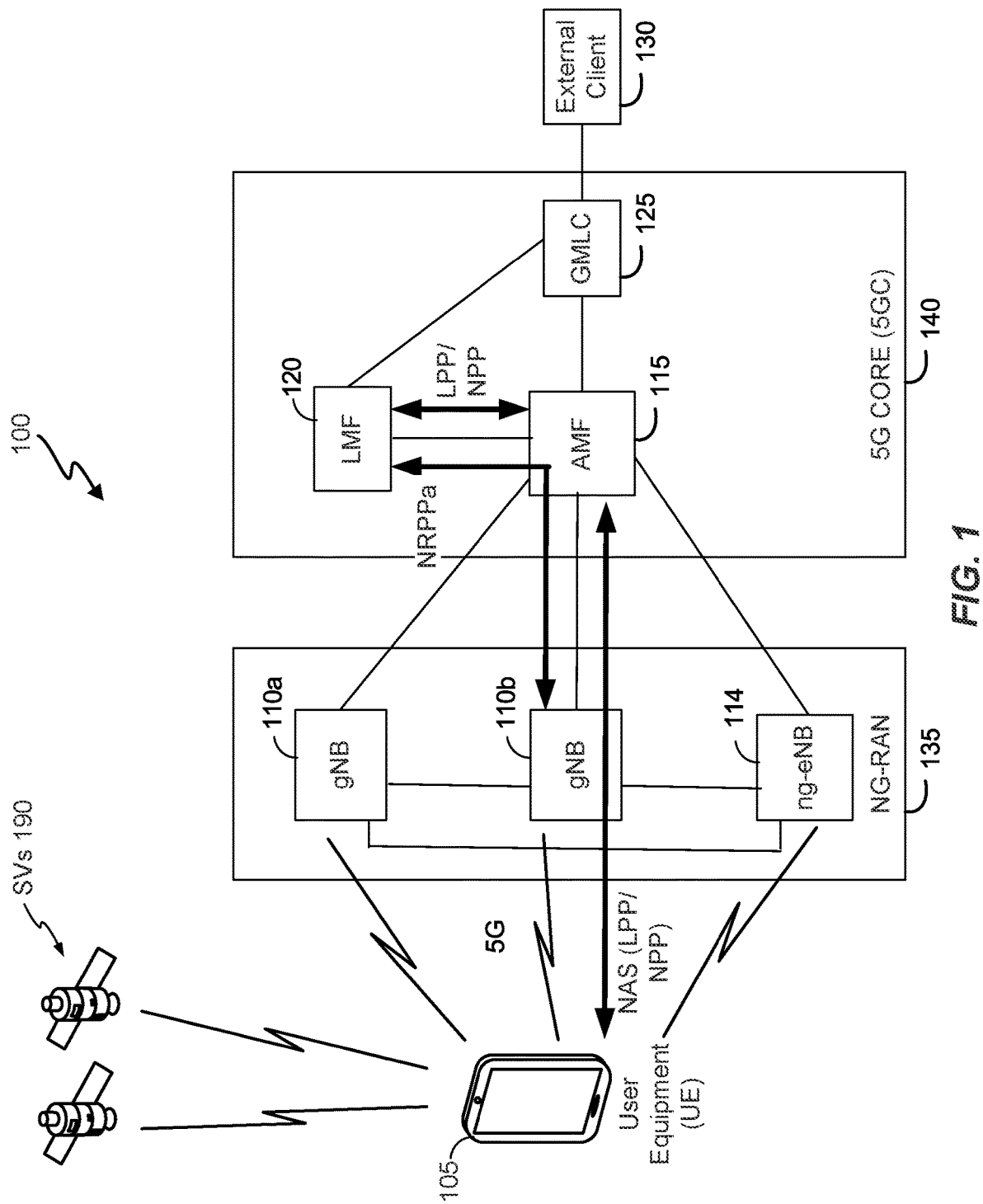
FIG. 1 is a diagram of an example communication system.

Referring to FIG. 1, a diagram of an example communication system 100 is shown. The communication system 100 comprises a mobile device (e.g., an IoT device, location tracker device, cellular telephone, or other user equipment (UE)) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The communication system 100 may utilize information from satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and next generation eNodeB (ng-eNB) 114, and the 5GC 140 includes an Access and Mobility Management Function (AMF) 115, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the LMF 120, and the GMLC 125 are communicatively coupled to each other, and the GMLC is communicatively coupled to an external client 130.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs 190, gNBs 110a-b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Tnternet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a-b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMP 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSST), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
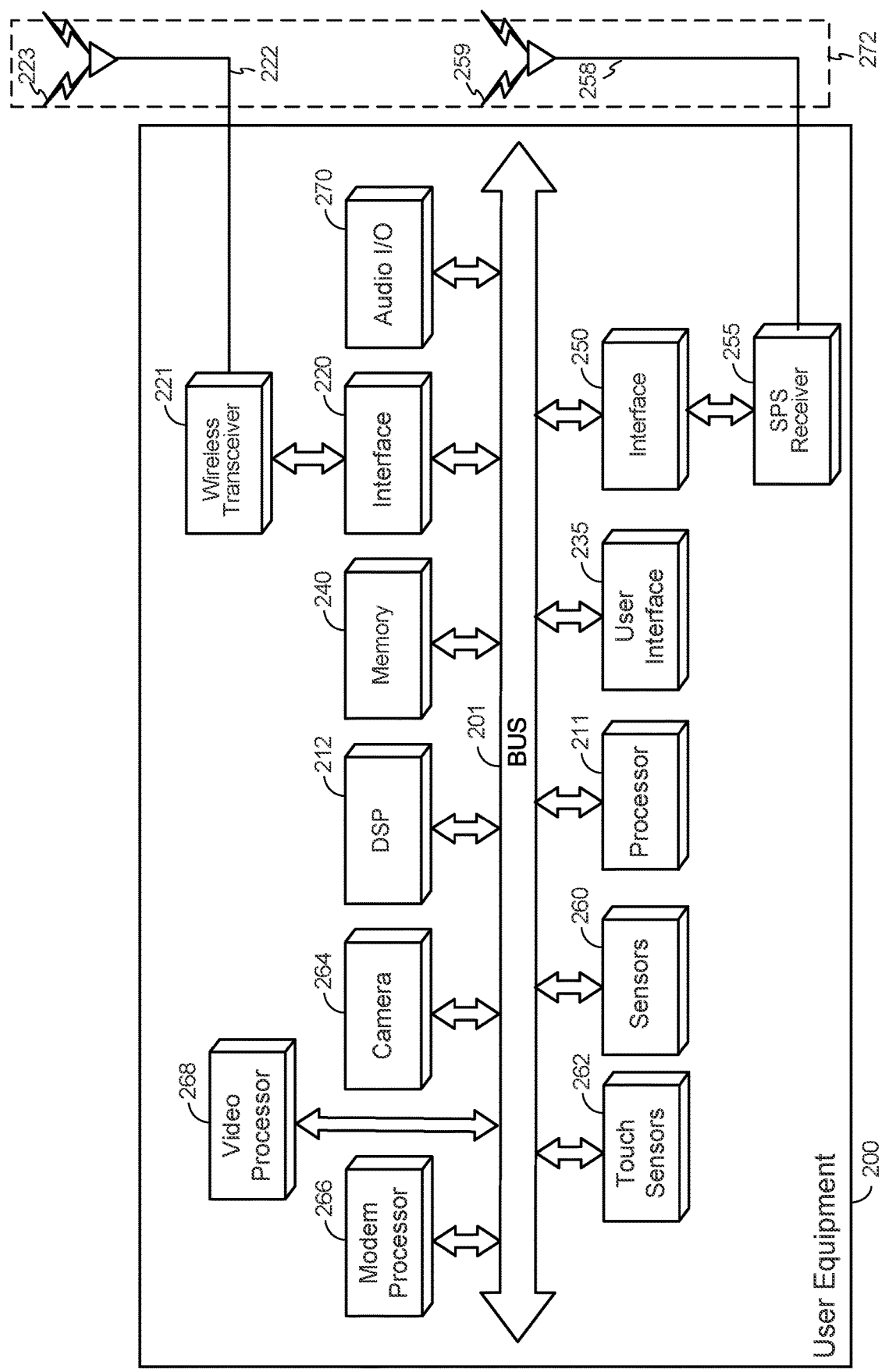
FIG. 2 is a block diagram of a mobile device.

Referring to FIG. 2, a schematic diagram of a mobile device 200 according to an embodiment is shown. The UE 105 as shown in FIG. 1 may comprise one or more features of the mobile device 200 shown in FIG. 2. Some of the features disclosed in FIG. 2 are optional. The UE 200 may be a handheld device (e.g., smartphone), a vehicle or other moving device (e.g., drone, plane, etc.). In certain embodiments, the mobile device 200 may comprise a wireless transceiver 221 which is capable of transmitting and receiving wireless signals 223 via a wireless antenna 222 over a wireless communication network. A wireless transceiver 221 may be connected to a bus 201 by a wireless transceiver bus interface 220. The wireless transceiver bus interface 220 may, in some embodiments, be at least partially integrated with the wireless transceiver 221. Some embodiments may include multiple wireless transceivers 221 and wireless antennas 222 to enable transmitting and/or receiving signals according to corresponding multiple wireless communication standards such as, for example, versions of IEEE Standard 202.11, CDMA, WCDMA, LTE, UMTS, GSM, AMPS, Zigbee, Bluetooth®, and a 5G or NR radio interface defined by 3GPP, just to name a few examples. In a particular implementation, the wireless transceiver 221 may receive and acquire a downlink signal comprising a terrestrial positioning signal such as a PRS. For example, the wireless transceiver 221 may process an acquired terrestrial positioning signal sufficiently to enable detection of timing of the acquired terrestrial positioning signal.

The mobile device 200 may comprise an SPS receiver 255 capable of receiving and acquiring SPS signals 259 via an SPS antenna 258 (which may be the same as the wireless antenna 222 in some embodiments). In an example, a remote antenna module 272 may include the wireless antenna 222, the SPS antenna 258, and other antennas, and may be communicatively coupled to the mobile device 200 via a single conductor. The remote antenna module 272 may include radio frequency front end components for various RF communications. For example, the remote antenna module may be configured as described in FIGS. 4, 6 and 8. The SPS receiver 255 and interface 250 may process, in whole or in part, the acquired SPS signals 259 for estimating a location of the mobile device 200. One or more general-purpose processor(s) 211, a memory 240, one or more digital signal processor(s) (DSP(s)) 212, and/or specialized processors (not shown) may be utilized to process acquired SPS signals, in whole or in part, and/or to calculate an estimated location of the mobile device 200, in conjunction with the SPS receiver 255. Storage of SPS, TPS or other signals (e.g., signals acquired from the wireless transceiver 221) or storage of measurements of these signals for use in performing positioning operations may be performed in the memory 240 or registers (not shown). The general-purpose processor(s) 211, the memory 240, the DSP(s) 212, and/or specialized processors may provide or support a location engine for use in processing measurements to estimate a location of the mobile device 200. For example, the general-purpose processor(s) 211 or the DSP(s) 212 may process a downlink signal acquired by the wireless transceiver 221 to, for example, make measurements of RSSI, RTT, AOA, TOA, RSTD, RSRQ and/or RSRQ.

Also shown in FIG. 2, the DSP(s) 212 and the general-purpose processor(s) 211 may be connected to the memory 240 through bus the 201. A particular bus interface (not shown) may be integrated with the DSP(s) 212, the general-purpose processor(s) 211, and the memory 240. In various embodiments, functions may be performed in response to execution of one or more machine-readable instructions stored in the memory 240 such as on a computer-readable storage medium, such as RAM, ROM, FLASH, or disc drive, just to name a few examples. The one or more instructions may be executable by the general-purpose processor(s) 211, specialized processors, or the DSP(s) 212. The memory 240 may comprise a non-transitory, processor-readable memory and/or a computer-readable memory that stores software code (programming code, instructions, etc.) that are executable by the processor(s) 211 and/or the DSP(s) 212 to perform functions described herein.

Also shown in FIG. 2, a user interface 235 may comprise any one of several devices such as, for example, a speaker, microphone, display device, vibration device, keyboard, touch screen, just to name a few examples. In a particular implementation, the user interface 235 may enable a user to interact with one or more applications hosted on the mobile device 200. For example, devices of the user interface 235 may store analog and/or digital signals on the memory 240 to be further processed by the DSP(s) 212 or the general purpose processor 211 in response to action from a user. Similarly, applications hosted on the mobile device 200 may store analog or digital signals on the memory 240 to present an output signal to a user. The mobile device 200 may optionally include a dedicated audio input/output (I/O) device 270 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 200 may comprise touch sensors 262 responsive to touching or pressure on a keyboard or touch screen device.

The mobile device 200 may comprise a dedicated camera device 264 for capturing still or moving imagery. The camera device 264 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose processor 211 and/or the DSP(s) 212. A dedicated video processor 268 may perform conditioning, encoding, compression or manipulation of signals representing captured images. A video processor 268 may decode/decompress stored image data for presentation on a display device (not shown) on the mobile device 200.

The mobile device 200 may also comprise sensors 260 coupled to the bus 201 which may include, for example, inertial sensors and environment sensors. Inertial sensors of the sensors 260 may comprise, for example, accelerometers (e.g., collectively responding to acceleration of the mobile device 200 in three dimensions), one or more gyroscopes or one or more magnetometers (e.g., to support one or more compass applications). Environment sensors of the mobile device 200 may comprise, for example, temperature sensors, barometric pressure sensors, ambient light sensors, camera imagers, microphones, just to name few examples. The sensors 260 may generate analog and/or digital signals that may be stored in the memory 240 and processed by the DPS(s) 212 or the general purpose processor 211 in support of one or more applications such as, for example, applications directed to positioning or navigation operations.

The mobile device 200 may comprise a dedicated modem processor 266 capable of performing baseband processing of signals received and downconverted at the wireless transceiver 221 or the SPS receiver 255. The modem processor 266 may perform baseband processing of signals to be upconverted for transmission by the wireless transceiver 221. In alternative implementations, instead of having a dedicated modem processor, baseband processing may be performed by a general purpose processor or DSP (e.g., the general purpose processor 211 or the DSP(s) 212). These are merely examples of structures that may perform baseband processing, and claimed subject matter is not limited in this respect.

Figure 3:
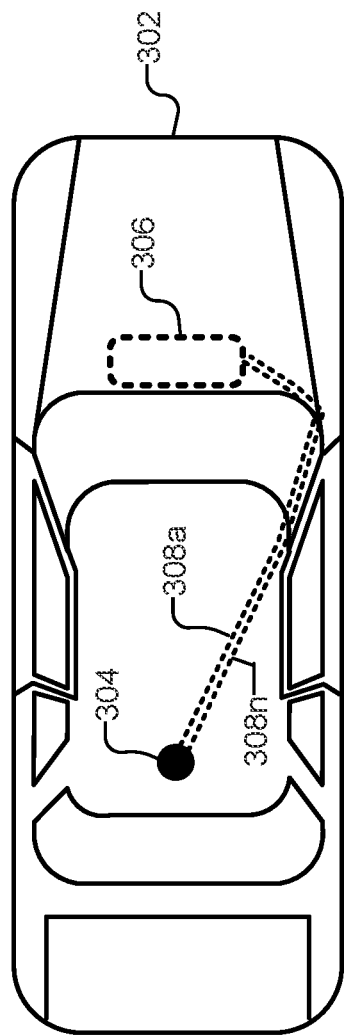
FIG. 3 is a diagram of a prior art automobile antenna system.

Referring to FIG. 3, a prior art automobile antenna system is shown. An automobile 302 includes a remote antenna 304 and one or more onboard components 306 such as receivers, transceivers and other control circuits. A plurality of cables 308a-308n may be used to couple the remote antenna 304 to the onboard components 306. For example, the remote antenna 304 may be a multifunction shark fin type antenna housing, and may include a multiple-input and multiple-output (MIMO) array for a wide area network, such as a Long Term Evolution (LTE) cellular network. The remote antenna 304 may also include active antennas for satellite navigation systems, and a MIMO array for 2.4/5.8 GHz WiFi communications. Each of the antenna arrays within the remote antenna 304 may include one of the plurality of cables 308a-308n (or one cable with a plurality of conductors). For example, the LTE antenna array may include two coaxial cables between a transceiver and the antenna housing, the satellite navigation antenna may require one coaxial cable between a satellite navigation receiver and the antenna housing, and the WiFi antenna array may require three coaxial cables between a transceiver and the antenna housing. Other cabling may also be connected to the onboard components 306 and the remote antenna 304 to send control signals. The plurality of cables 308a-308n increases the cost and installation complexity of the remote antenna 304.

Figure 4:
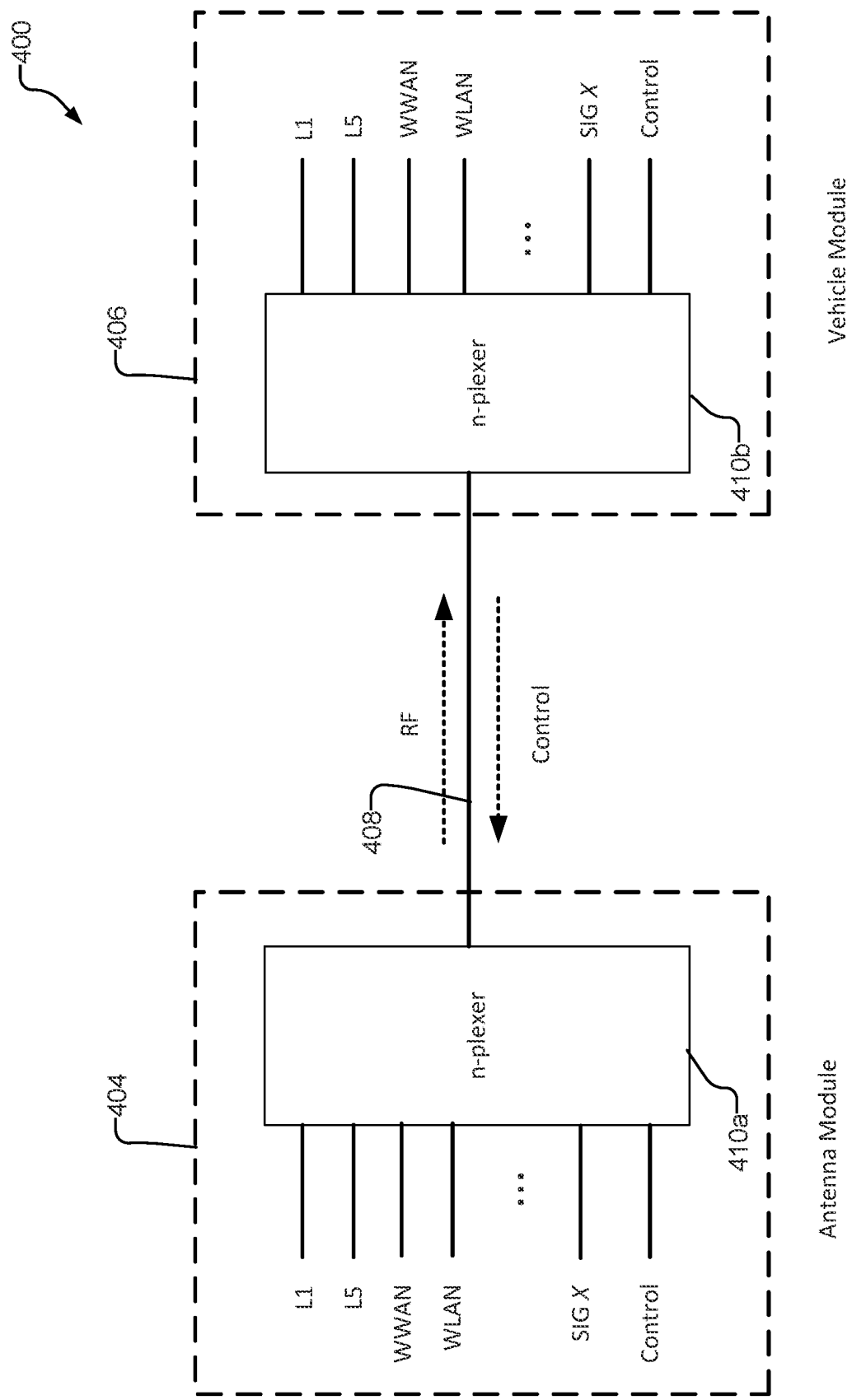
FIG. 4 is a block diagram of an example remote antenna control system.

Referring to FIG. 4, a block diagram of an example antenna control system 400 is shown. The antenna control system 400 includes an antenna module 404, a vehicle module 406, and a single cable 408 communicatively coupled between the antenna module 404 and the vehicle module 406. The antenna module 404 is an example of the remote antenna module 272. The antenna control system 400 may utilize multiplexers to receive multiple input signals and synthesize a single output signal on the single cable 408.

For example, a first n-plexer 410a in the antenna module 404 and a second n-plexer 410b in the vehicle module 406 may be configured to multiplex different RF and control signals such as satellite navigation (e.g., L1/L5 bands), cellular WWAN signals (e.g., LTE5G), WiFi WLAN, and other RF signals (e.g., Sig X), to utilize the single cable 408 for both RF and control signals. The number and types of RF and control signals may vary based on the components and capabilities of the antenna module.

Figure 5:
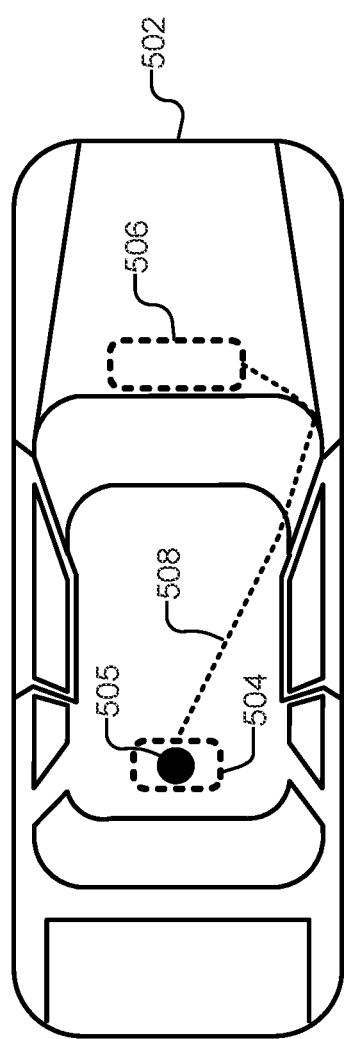
FIG. 5 is a diagram of an example automobile with a remote controlled antenna system.

Referring to FIG. 5, an example automobile 502 with a remote controlled antenna system is shown. The automobile 502 includes an antenna module 504 with one or more antenna elements 505, a cable 508, and a vehicle module 506. In an example, the vehicle module 506 may have some or all of the components of the mobile device 200, and the mobile device 200 may be an example of the vehicle module 506 with the wireless antennas 222 and the SPS antenna 258 in the antenna module 504. The antenna module 504 and the vehicle module 506 may include multiplexers such as described in FIG. 4 configured to enable multiple RF and control signals to utilize the cable 508. In an example, the cable 508 may be a coaxial cable with a single conductor and a shield (e.g., wherein the shield is electrically coupled to a system ground). Other control solutions, such as DC bias voltages as described herein, may be used to control the antenna module 504. In an example, the antenna module 504 may include antennas and signal amplifiers for a satellite positioning system such as the Global Positioning System (GPS), and the control signal may be used to improve power usage. For example, GPS baseband receivers in the vehicle module 506 may be configured with L1 and L5 only modes to save power. A control signal may be configured to turn off the L1 or L5 low noise amplifiers (LNAs) in the antenna module 504 in sync with the baseband to improve power savings. The antenna module 504 may include other antennas and amplifiers including multiple external LNA (eLNA) stages and the control signals may be used to toggle eLNA stages based on signal requirements such as the gain presented to the RF circuitry in the vehicle module 506. The gain may vary based on the length of the cable 508, as well as other factors such as attenuation and/or insertion losses in the vehicle module 506. The antenna module 504 may include programmable gain amplifiers (PGAs) and the control signal may be used to implement controllable gain stages. In an example, the control signals may be used to switch in/out notches or filtering depending on WWAN/WLAN concurrency scenarios. In an example, control signals may be configured to change the filter center frequency and bandwidth, or filter configuration (e.g., notch, lowpass filter (LPF), highpass filter (HPF), bandpass filter (BPF)), and/or filter response. For example, the control signal may be configured to change the notch center frequency and bandwidth (e.g., change from LTE B13/14 notch to Ligado notch). In an example, the control signals may be used to select different signal paths (e.g., different center frequency and bandwidth) from the same antenna. The control signals may be used to tune (e.g., impedance/aperture) an antenna to either a different GNSS band or between WWAN and GNSS, or to tune for antenna impedance matching based on installation factors such as a distance from the ground plane. The control signals may be used to vary antenna patterns and vary other antenna attributes such as changing between linear polarization and right hand circular polarization. These are examples of control signals and responses, and not limitations. Other control signals may utilize the cable 508 based on the capabilities of the antenna and vehicle modules.

Figure 6:
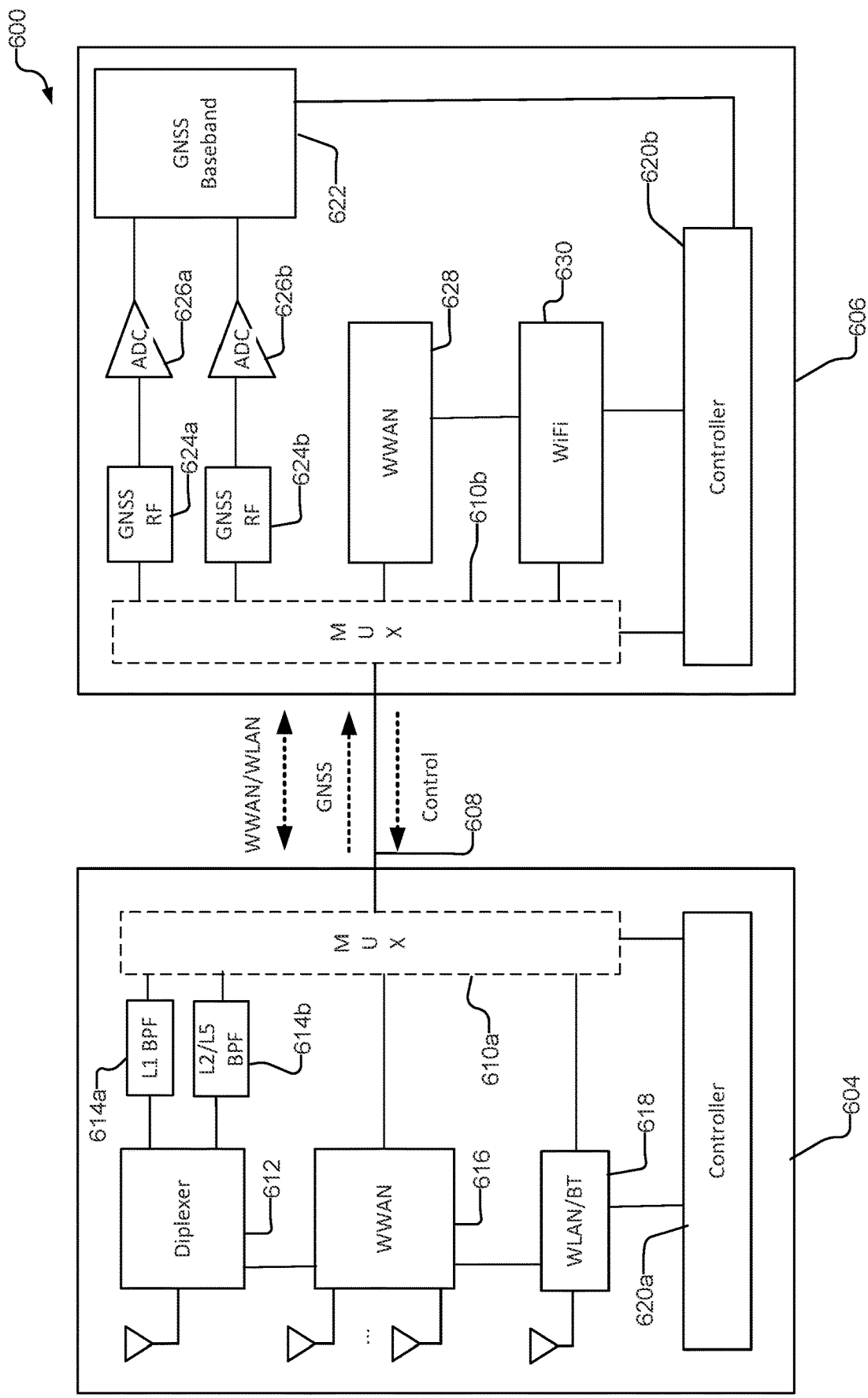
FIG. 6 is a block diagram of an example remote antenna control system with a plurality of radio frequency submodules.

Referring to FIG. 6, an example remote antenna control system 600 with a plurality of radio frequency submodules is shown. The antenna control system 600 may be for an automotive application, such as described in FIG. 5, or may be used for other applications where an antenna module 604 is installed remote from a processing module 606 and configured to communicate through a single conductor 608. For example, in an Internet of Things (IoT) use case, a remote antenna may be used to improve signal reception. The remote antenna module 272 is an example of the antenna module 604. In an example, the antenna module 604 may include a GNSS submodule with one or more GNSS antennas with a diplexer 612 and a plurality of band pass filters (BFPs), such as a L1 BPF 614a and a L2/L5 BPF 614b. A WWAN submodule 616 may include an antenna array (e.g., to support MIMO), and a WLAN submodule 618 may be configured to support other wireless signals such as WiFi and/or Bluetooth (BT). The WWAN submodule 616 and the WLAN submodule 618 may include RF front-end (RFFE) components such as, but not limited to, embedded and discrete duplexers, diplexers, triplexers, extractors and bandpass, highpass, and lowpass filters. The BPFs 614a-b, WWAN submodule 616 and the WLAN submodule 618 may be communicatively coupled to a first multiplexer 610a and a first controller 620a. The first controller 620a is configured to provide control signals to the submodules in the antenna module 604 based on control signals received on the single conductor 608 and the capabilities of the submodules. The first multiplexer 610a is configured to synthesize a signal based on the signal inputs from the submodules and provide the synthesized signal to a second multiplexer 610b in the processing module 606 via the single conductor 608. In an example, the multiplexers 610a, 610b may be configured to interleave the digital signals associated with the WWAN and WLAN submodules. In an example, the multiplexers 610a, 610b may be configured to shift the frequencies of the signals associated with the GNSS, WWAN, and WLAN components and then utilize filters (not shown in FIG. 6) in the antenna and processing modules to separate out the respective signals.

The processing module 606 includes a GNSS receiver with a GNSS baseband processor 622 receiving inputs from the second multiplexer 610b via a first RF path including a first filter 624a and a first analog-to-digital converter (ADC) 626a, and a second RF path including a second filter 624b and a second ADC 626b. A WWAN processing module 628 and a WiFi processing module 630 are communicatively coupled to the second multiplexer 610b and a second controller 620b. In an example, the processing modules 628, 630 may include one or more modem processors configured to perform baseband processing of signals received at the respective WWAN submodule 616 and the WLAN submodule 618. The processing module 606 may also include filters to enable frequency shifting and filtering of the GNSS, WWAN, WLAN signals on the single conductor 608. The second controller 620b is configured to receive control signals from the processing modules 628, 630 and generate a control signal for the first controller 620a. In an example, the control signal may be provided via the multiplexers 610a-b via the single conductor 608. The control signal may be based on analog or digital signaling techniques. In an example, the control signal may be different bias voltage levels. Other digital techniques such as pulse width modulation (PWM) and universal asynchronous receiver-transmitter (UART) protocols may be used.

In an example, the multiplexers 610a, 610b are optional as the RF signals from the submodules may be on different frequencies and may utilize the single conductor 608 without the need for synthesizing a multiplexed signal. In an example, diplexers may be used for RF signals within the same band. The control signal may be based on a bias voltage on the single conductor 608 and may utilize analog and digital signaling techniques to enable the first controller 620a to vary the states of the submodules.

Referring to FIG. 7, with further reference to FIG. 6, a table 700 of example use cases and control signals is shown. The table 700 includes a list of use cases 702 and corresponding control signals 704 to control the antenna module 604. The controllers 620a-c and the corresponding control signals may be configured for the different use cases 702. The control signals 704 may enable the controllers 620a-b to vary the state of the submodules in the antenna module 604. For example, controlling LNAs, PGAs, or other variable components (e.g., capacitors, inductors) in the submodules. In an example, the controllers 620a-b may be used for beamforming processes in the antenna module 604. Static and dynamic beamforming may be used for improved signal reception, and/or for anti-jamming procedures. In an example, one or more antenna arrays within the antenna module 604 may have orientation actuators and the controllers 620a-b may be configured to control and move the physical antenna to vary the physical orientation based on the location of a signal source (e.g., satellite communications). The controllers 620a-b may be configure to control a smart reflector for a WWAN signal direction or redirection. For example, a smart reflector may receive power and control parameters from the first controller 620a without providing RF signals to the baseband circuitry in the processing module 606. The control signal may be configured for antenna timing, phase delay tuning, and other adjustments, such as prior to combining or beamforming. Other state or generic control parameters for the submodules may be set via the control signal. In high frequency use cases, such as millimeter wave (mmW), the antenna module 604 may be configured to downconvert a mmW signal to an IF to run thru the single conductor 608 because a mmW signal may experience significant losses over long cabling distances. The controllers 620a-b may be configured to determine an IF frequency (e.g., in the low GHz range) and/or signal bandwidth, to reduce the losses. These use cases are examples, and not limitations, and other remote antenna systems may be configured to utilize other control signals.

Figure 8:
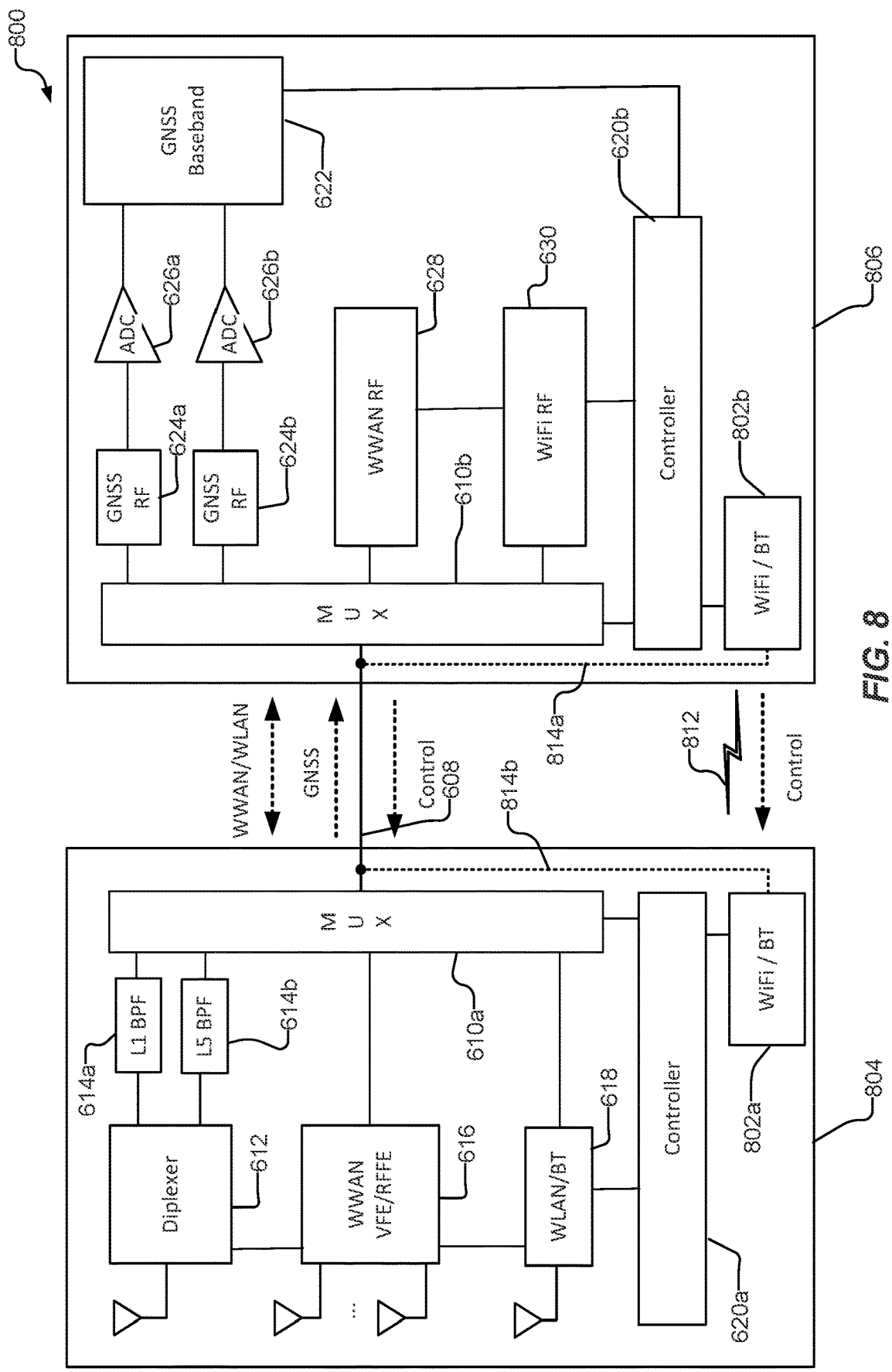
FIG. 8 is a block diagram of an example remote antenna control system with a plurality of radio frequency submodules and a radio frequency control signal.

Referring to FIG. 8, with further reference to FIG. 6, an example remote antenna control system 800 with a plurality of radio frequency modules and a radio frequency control signal is shown. In an example, an antenna module 804 and a processing module 806 may include wireless transceivers 802a, 802b configured to transmit and receive signals based on known protocols such as WiFi and BT. For example, the controllers 620a-b may be communicatively coupled to a respective wireless transceiver 802a-b, and the wireless transceivers 802a-b may be configured to exchange control information via a wireless link 812. The wireless link 812 may utilize known protocols such as WiFi and BT to exchange the control information. Other wireless proprietary and non-proprietary technologies, such as Zigbee, Ultra-wideband (UWB), and other device-to-device (D2D) and sidelink protocols may be used. In an example, the signals from the wireless transceivers 802a-b may be wired to the single conductor 608 via respective connections 814a, 814b rather than transmitting the wireless link 812 over the air. Utilizing a wireless protocol over a wired connection provides several technical benefits. For example, since the wireless transceivers 802a-b are configured to utilize standardized protocols, the wireless transceivers 802a-b may be components from different sources and/or manufacturers. The standardized components may lower the cost of the remote antenna control system 800. Utilizing the single conductor 608 may avoid additional interference as compared to the over-the-air (OTA) wireless link 812, and the wired transmission may enable longer communication distances and through more obstructions. The wired connection may also reduce the power requirements as compared to the wireless link 812 (e.g., OTA link). The wired connection may utilize the IF of the wireless transceivers 802a-b or the specified RF.

Figure 9:
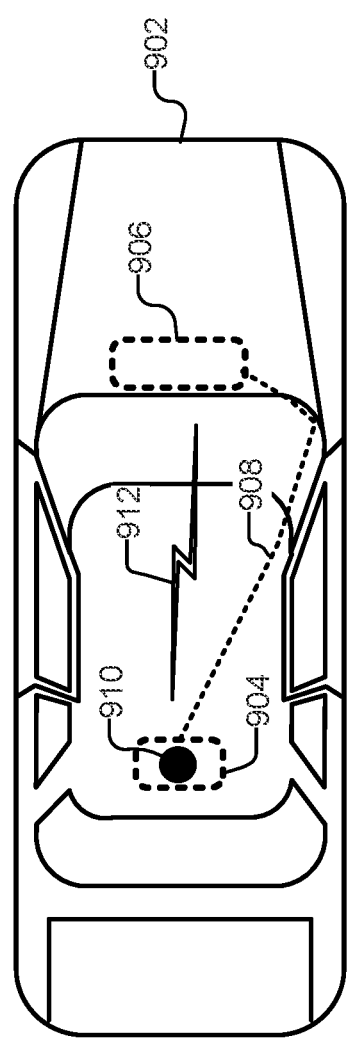
FIG. 9 is a diagram of an example remote antenna control system utilizing radio frequency control signals.

Referring to FIG. 9, with further reference to FIG. 8, an example remote antenna control system utilizing radio frequency control signals is shown. In an embodiment, the remote antenna control system 800 may be used in an automotive application such as depicted in FIG. 9. An automobile 902 may include an antenna module 904 with one or more antenna elements 910, communicatively coupled to a vehicle module 906 via a coaxial cable 908. The antenna module 904 may include some or all of the components of the antenna module 804 and the vehicle module 906 may include some or all of the components of the processing module 806. The coaxial cable 908 may be used for RF signals between the antenna module 904 and the vehicle module 906. In an example, the antenna module 904 and the vehicle module 906 may utilize an OTA wireless link 912 to exchange control signals for controlling the antenna module 904. In another example, the antenna module 904 and the vehicle module 906 may utilize wireless protocols (e.g., WiFi, BT, etc.) transmitted over the coaxial cable 908 to exchange control signals for controlling the antenna module 904 (i.e., without transmitting OTA signals).

Figure 10:
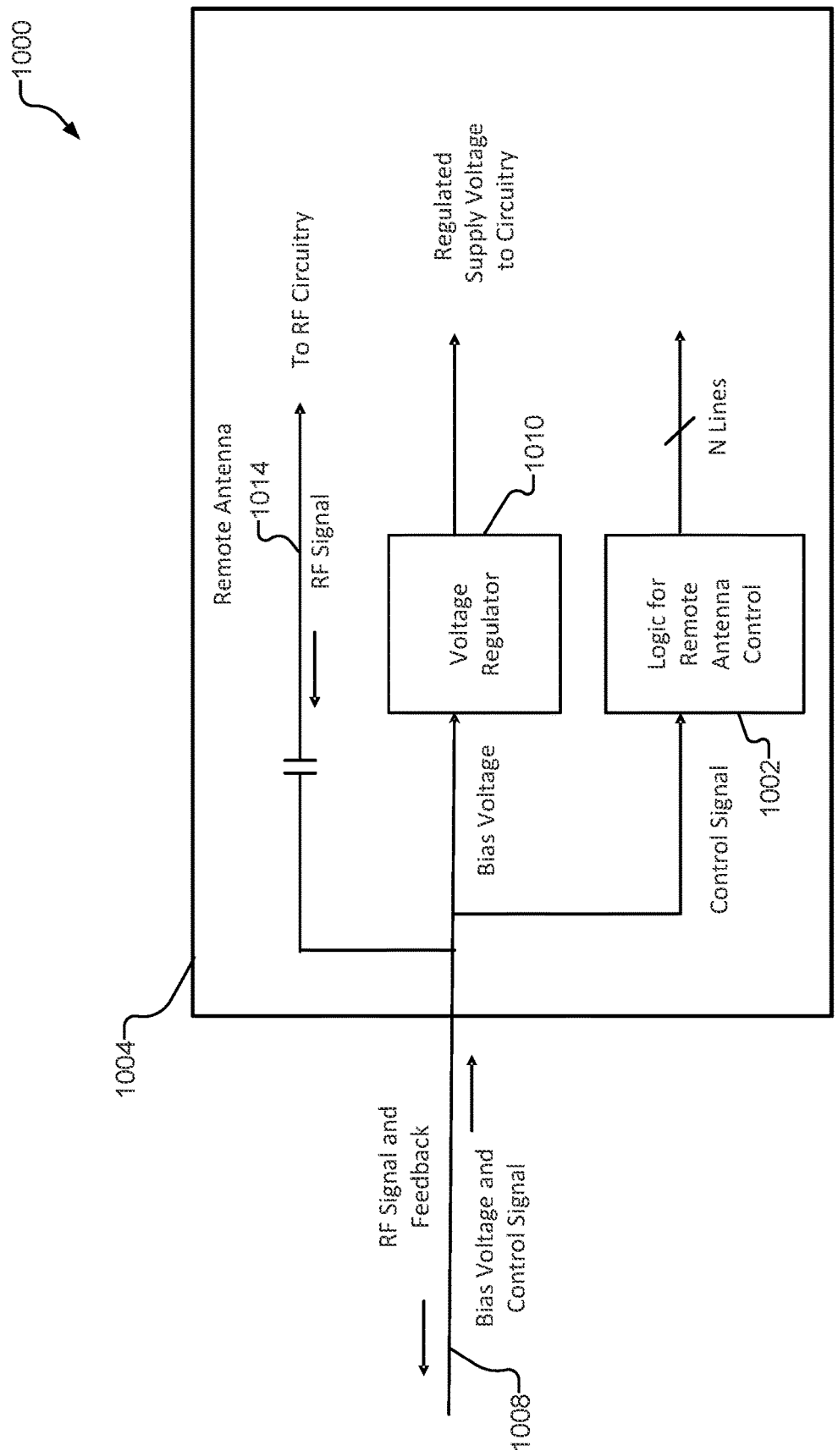
FIG. 10 is a block diagram of an example remote antenna module.

Referring to FIG. 10, with further reference to FIG. 5, a diagram 1000 of an example remote antenna module 1004 is shown. The remote antenna module 1004 may be utilized in an automotive application such as the antenna module 504 in FIG. 5. In an example, a single conductor 1008 may be used to communicatively couple the remote antenna module 1004 to a receiver unit (not shown in FIG. 10) such as the vehicle module 506. The single conductor 1008 may be a coaxial cable or other feedline configured to convey RF signals 1014 from the remote antenna module 1004 to the receiver unit, and control signals from the receiver unit to the remote antenna module 1004. The RF signals 1014 may be capacitively coupled to the single conductor 1008. The control signals may be based on analog and digital signals transmitted via the single conductor 1008 as described herein. A logic module 1002 may be configured to receive the control signal and modify the state of the remote antenna module 1004 based on the use cases described herein (e.g., active LNAs, modify filters, vary PGAs, etc.). A voltage regulator module 1010 may be configured provide a regulated supply voltage to the other modules in the remote antenna module 1004 and to reduce the impact of variations in the bias voltages caused by the control signals on the single conductor 1008.

Figure 11A:
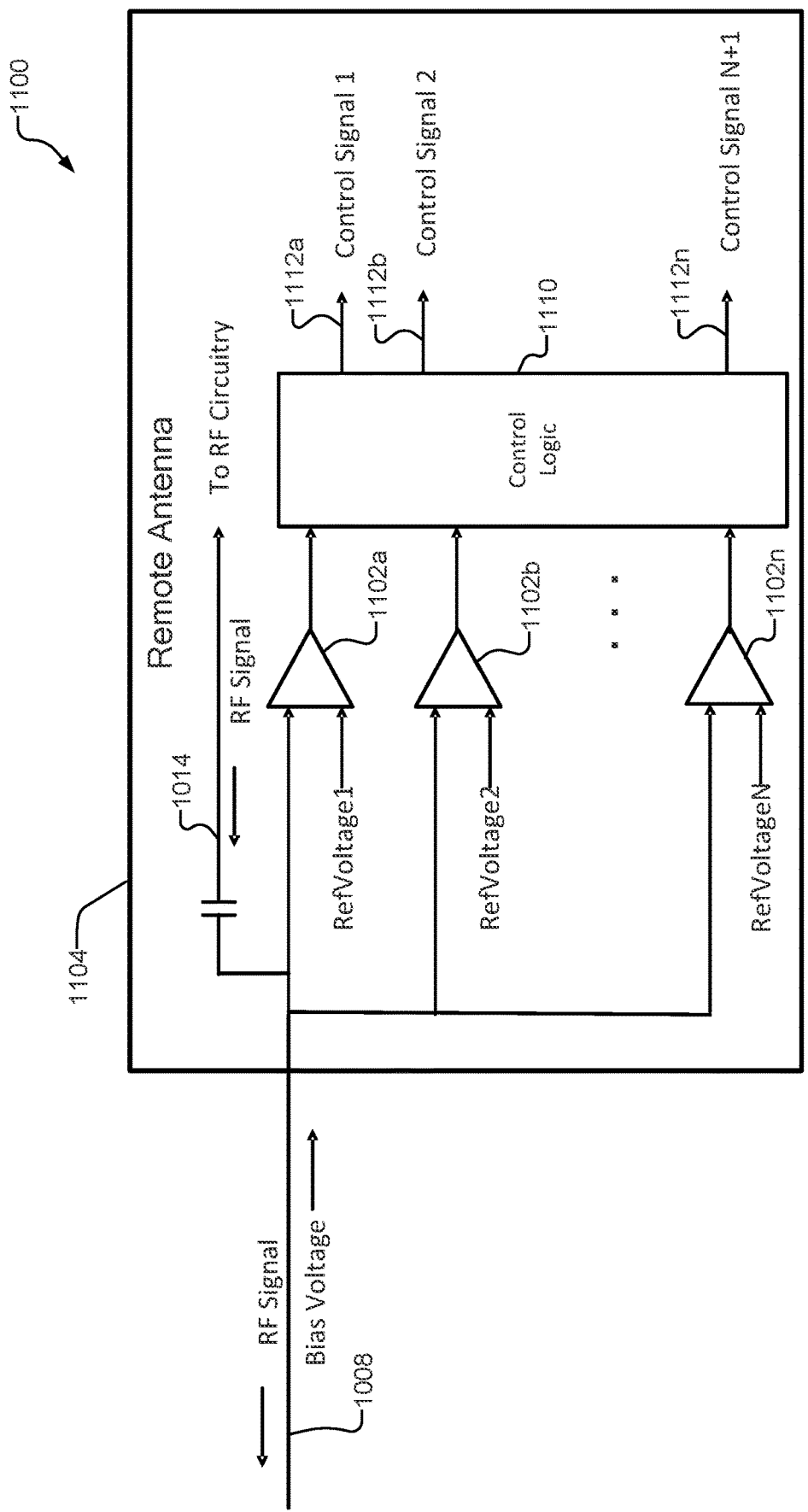
FIG. 11A is a block diagram of a first example antenna module utilizing direct current bias voltage control.
Figure 11B:
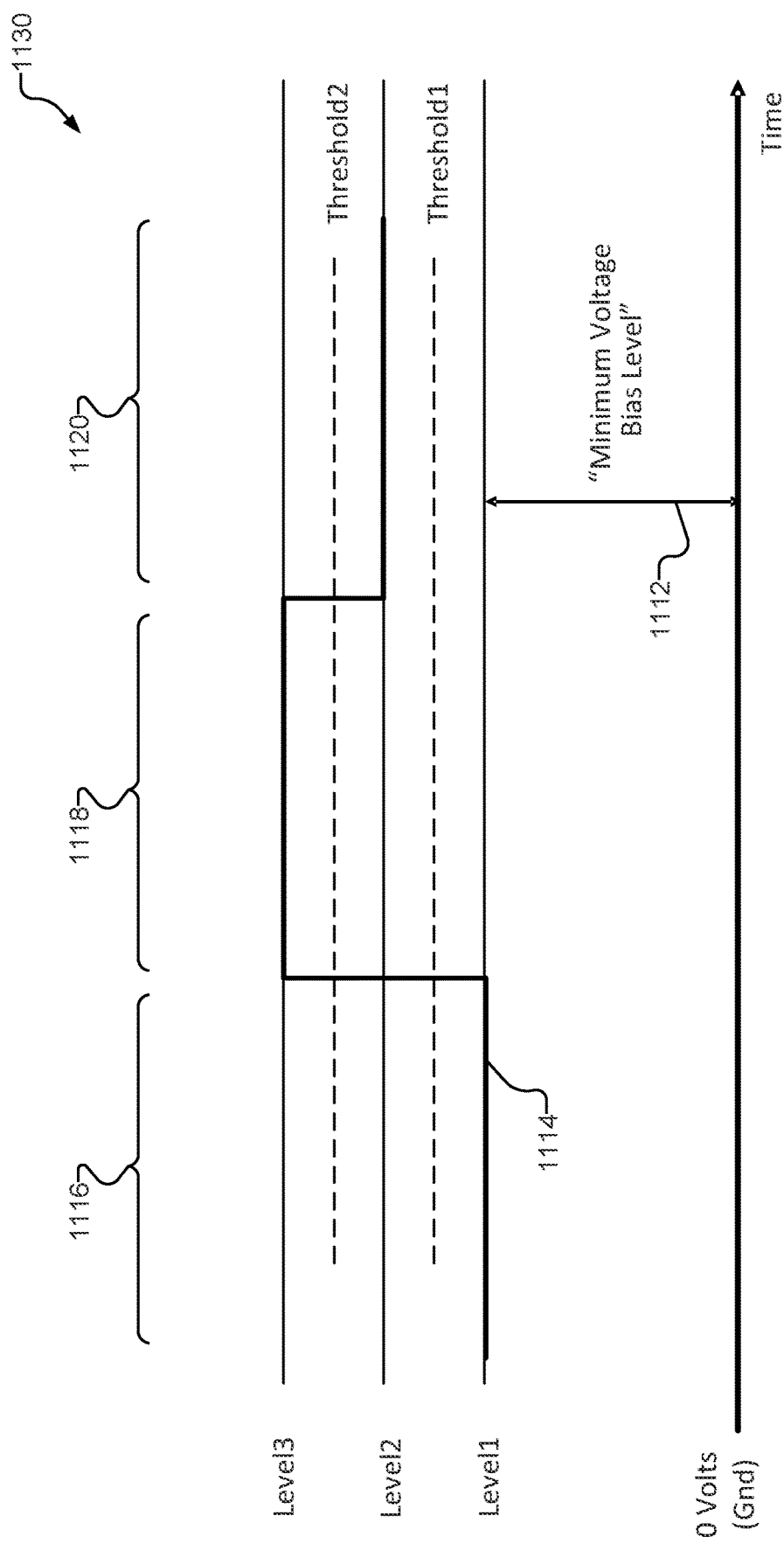
FIG. 11B is a graph of an example of direct current bias voltage control signal.

Referring to FIG. 11A, a block diagram 1100 of a first example antenna module 1104 utilizing direct current bias voltage control is shown. The antenna module 1104 may utilize the single conductor 1008 for RF signals and control signals based on bias voltage changes. RF signals 1014 may be isolated from the DC signal via capacitors, or other isolation techniques as known in the art. In an example, a plurality of comparators 1102a, 1102b, 1102n may be used to determine different states based on the value of a bias voltage on the single conductor 1008. N number of comparators may be used to detect N+1 unique states. The plurality of comparators may be used as input to a control logic circuit 1110 to generate a plurality of control signals 1112a-n. The control signals 1112a-n may be used to control LNAs, filter settings, gain settings, or other use cases as described herein. In an example, referring to FIG. 11B, a vehicle module 506 (or other receiver unit) may be configured to provide a bias voltage signal 1114 such as depicted in the graph 1130. The bias voltage signal 1114 on the single conductor 1008 may be at least a minimum voltage bias level 1112 above ground (e.g., 3-10V), and a number of threshold values may be assigned based on the number of control states required. For example, in a first period 1116 the bias voltage signal 1114 is at a first value which is between the minimum voltage bias level and a first threshold (e.g., level 1). In a second period 1118 the bias voltage signal 1114 is at a second value which is greater than a second threshold (e.g., level 3). In a third period 1120 the bias voltage signal 1114 is at a third value which is greater than the first threshold and less than the second threshold (e.g., level 2). The numbers of thresholds and levels are examples and not limitations as different numbers may be used to generate an increased number of control signals. In an example, the differences between threshold values may vary between 0.2V and 1.0V. Larger differences may be used when fewer control signals are required.

Figure 11C:
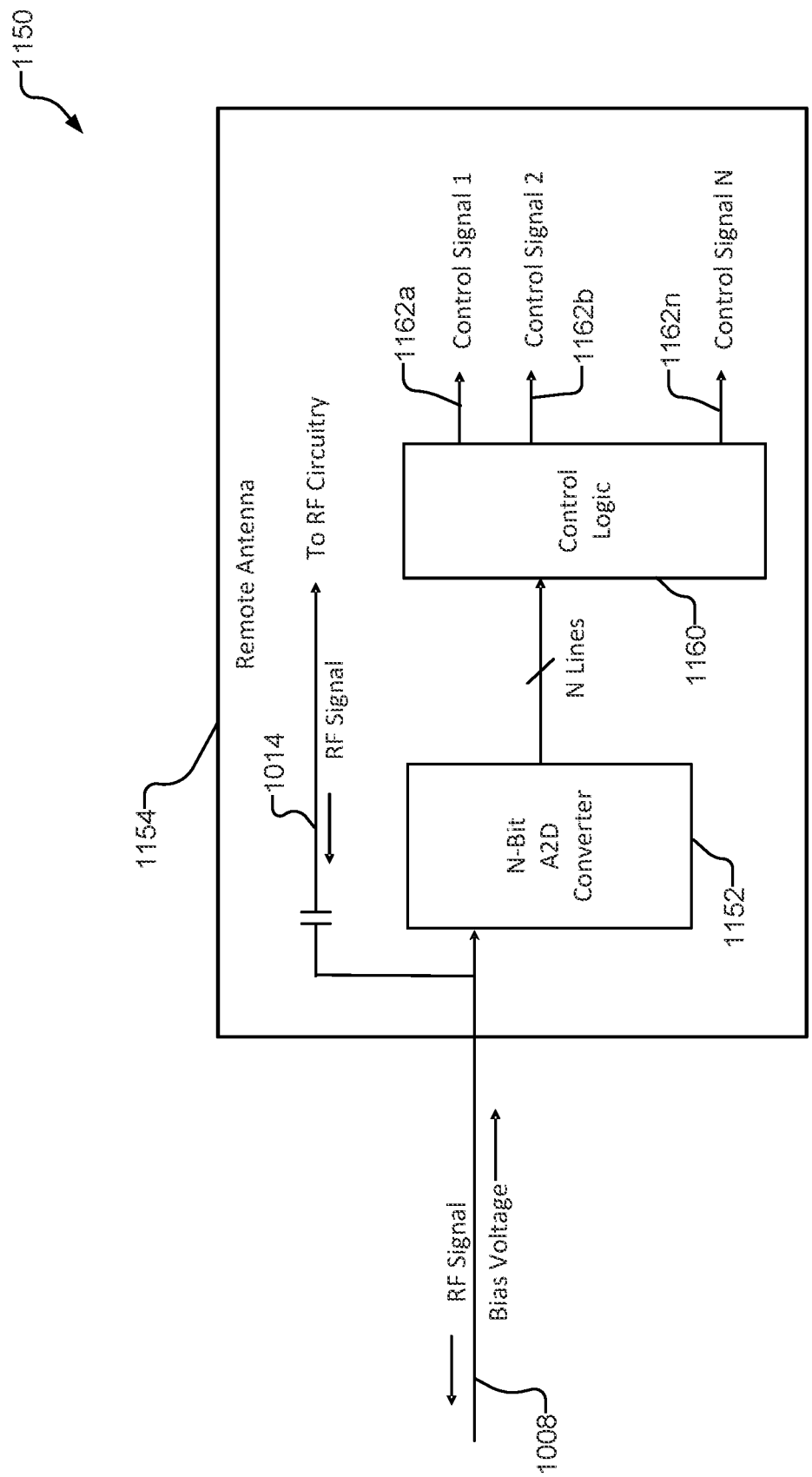
FIG. 11C is a block diagram of a second example antenna module utilizing direct current bias voltage control.

Referring to FIG. 11C, a block diagram 1150 of a second example antenna module 1154 utilizing DC bias voltage control is shown. The antenna module 1154 includes a N-bit analog-to-digital (A2D) converter 1152 configured to receive the bias voltage signal 1114 via the single conductor 1008. The A2D converter 1152 may be operably coupled to a control logic module 1160 configured to generate a plurality of control signals 1162a, 1162b, 1162n. An N bit A2D converter may yield $2^N$ unique states. The RF signals 1014 may be isolated from the DC signal via capacitors, or other isolation techniques as known in the art. The control signals 162a-n may be used to control LNAs, filter settings, gain settings, or other use cases as described herein (e.g., FIG. 7).

Figure 12A:
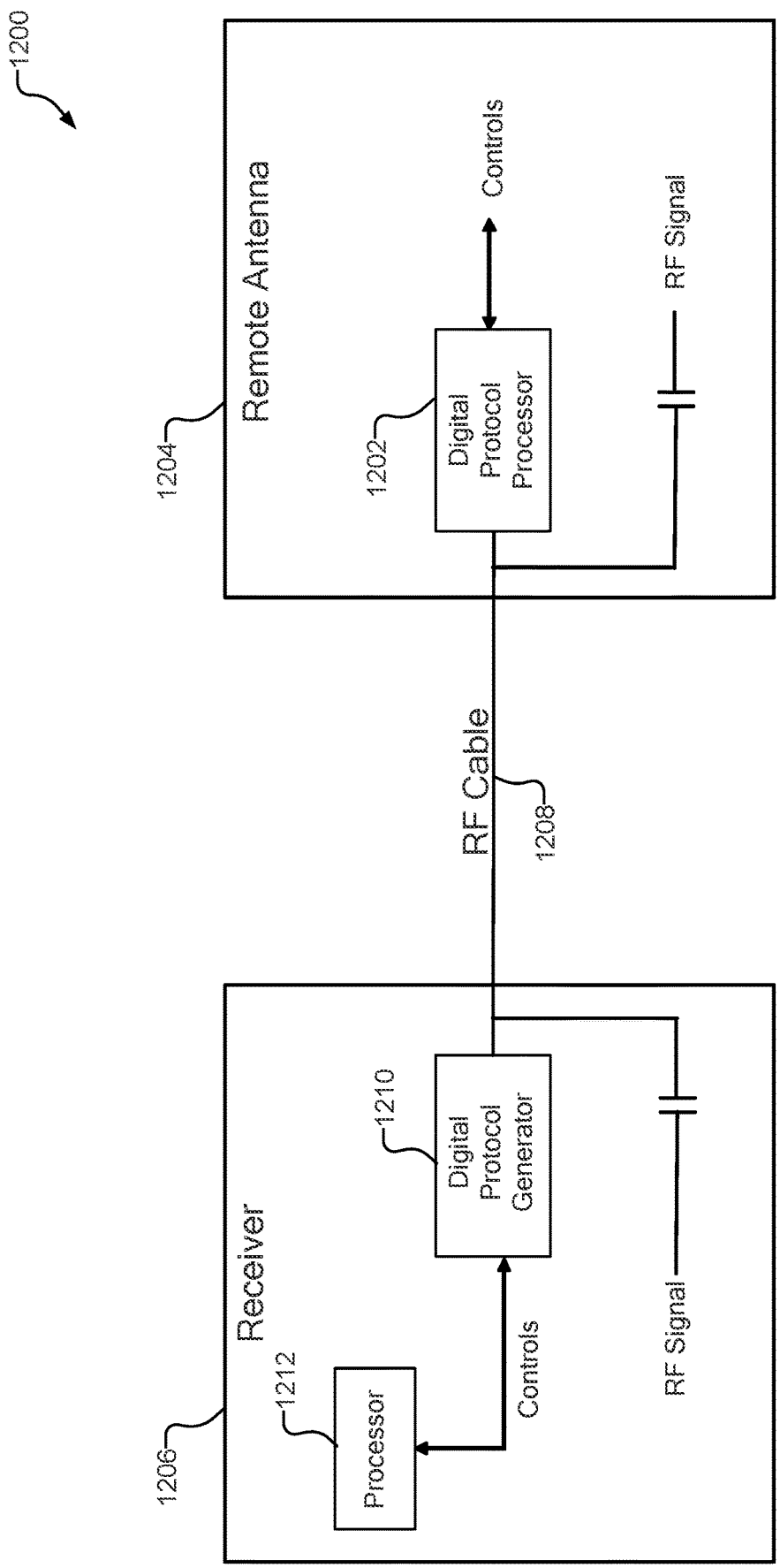
FIG. 12A is a block diagram of an example digitally controlled antenna system.
Figure 12B:
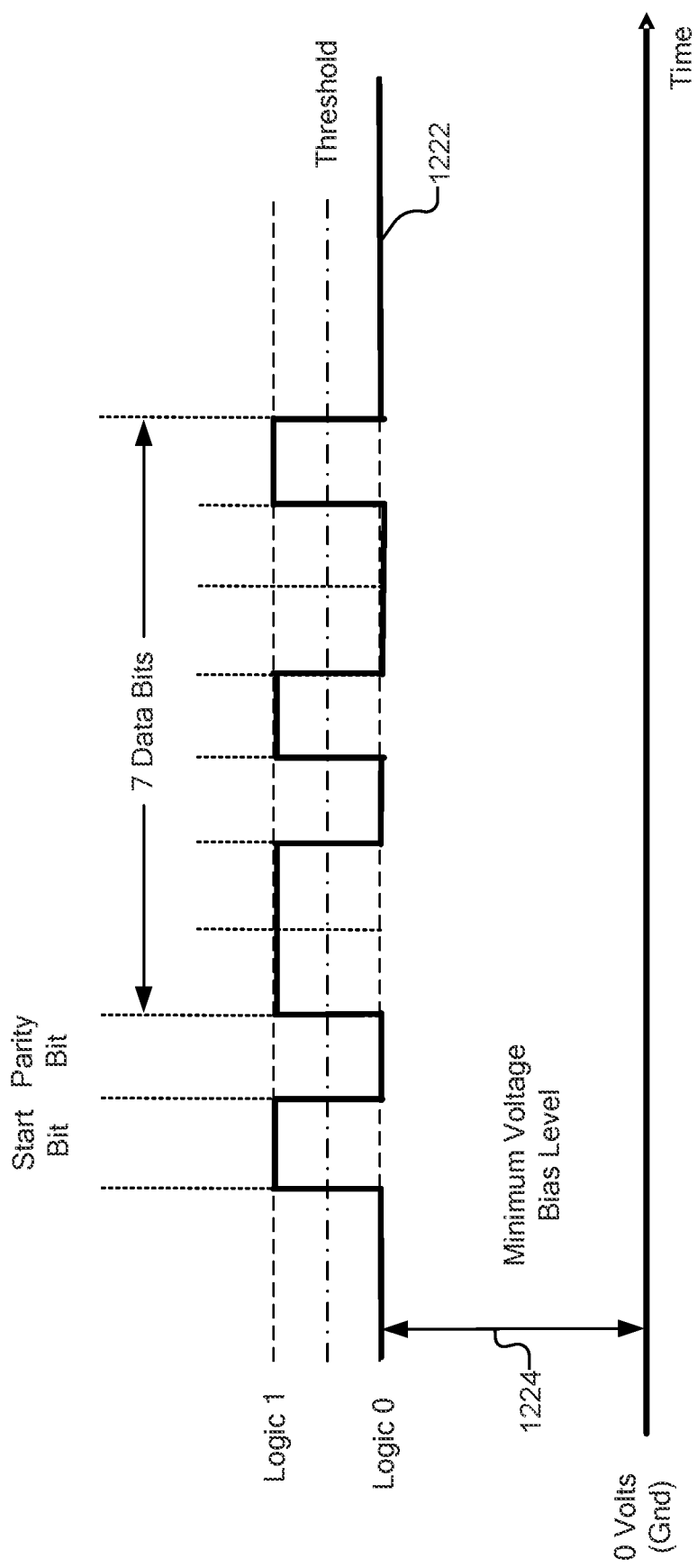
FIG. 12B is an example digital signal for controlling a remote antenna.

Referring to FIG. 12A, a block diagram of an example digitally controlled antenna system 1200 is shown. The system 1200 includes a receiver module 1206 and an antenna module 1204 communicatively coupled via a RF cable 1208, such as a coaxial cable or other conductor configured to enable RF and control signals to propagate between the receiver module 1206 and the antenna module 1204. The receiver module 1206 may include a processor 1212 configured to control components in the antenna module 1204 such as LNAs, filter settings, gain settings, or other modules and/or components as described herein. In an example, the processor 1212 may be communicatively coupled to a digital protocol generator module 1210 configured to generate a control signal to send to a digital protocol processor module 1202 in the antenna module 1204 via the RF cable 1208. The receiver module 1206 and antenna module 1204 may be configured to utilize combinatorial control logic, or more complex protocols such as UART communications. For example, referring to FIG. 12B, the digital protocol generator module 1210 may be configured to generate a digital control signal 1222 based on two voltage levels such as a Logic 0 value which is above a minimum voltage bias level 1224, and a Logic 1 value, which is above a threshold voltage value. The digital control signal 1222 utilizes 7 bits which may enable 128 different possible states that can be controlled, or may enable the independent control of the binary states of 7 different components in antenna module 1204. The digital control signal 1222 is an example, and not a limitation, as other signals and protocols may be used. In an example, a more complex protocol may incorporate the use of amplitude (e.g., UART), width (e.g., duration), and/or detection of rising or falling edges.

Figure 12C:
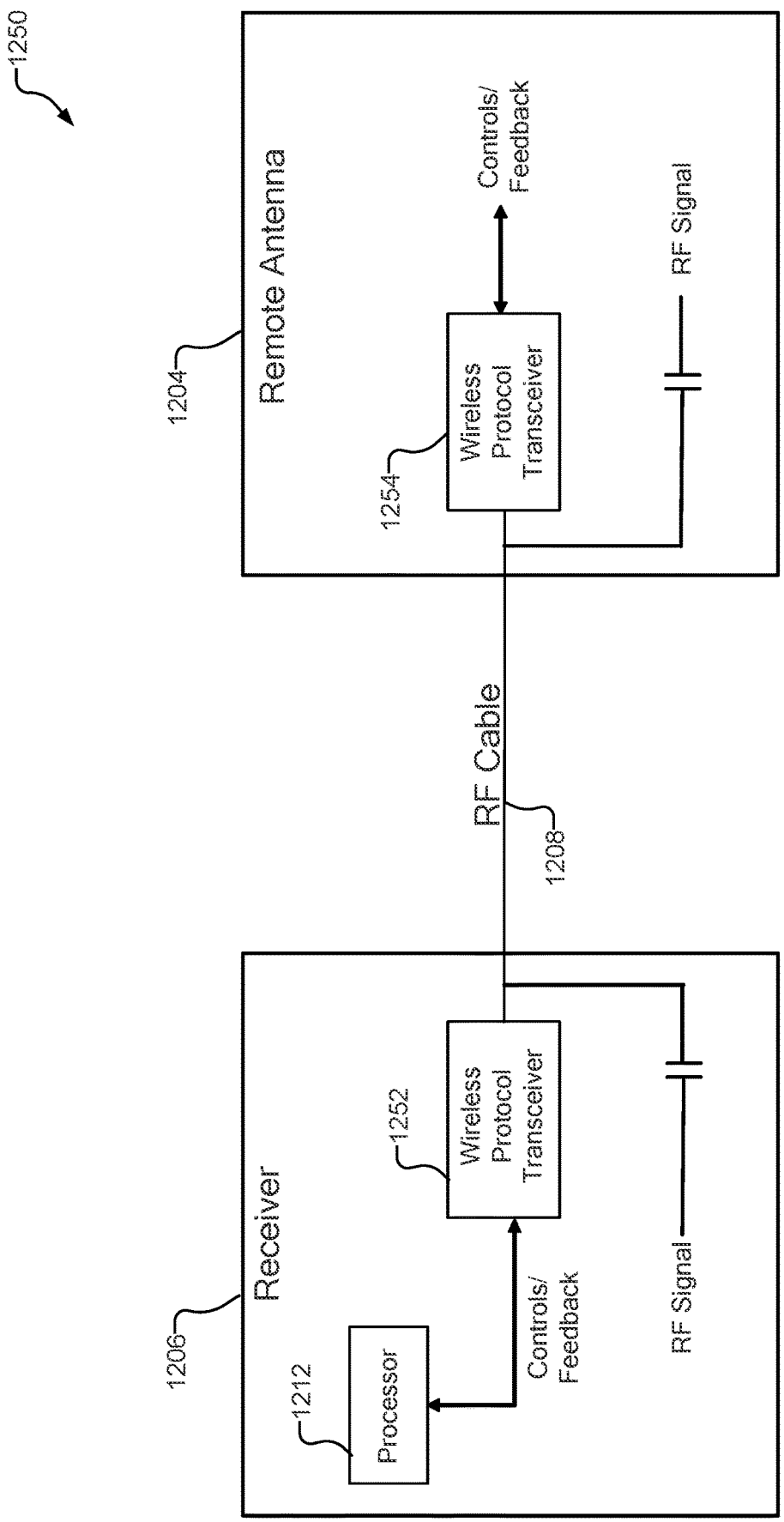
FIG. 12C is a block diagram of an example digitally controlled antenna system utilizing a wireless protocol transmitted via a radio frequency signal conductor.

In an example, referring to FIG. 12C, an example digitally controlled antenna system 1250 may utilize digital control signals based on wireless protocols which are transmitted via the RF cable 1208 rather than over the air. For example, the processor 1212 may send and receive control and feedback information via a first wireless protocol transceiver 1252 in the receiver module 1206. The first wireless protocol transceiver 1252 is configured to communicate with a second wireless protocol transceiver 1254 disposed in the antenna module 1204 to exchange control and feedback information. The wireless protocol transceivers 1252, 1254 may utilize known protocols such as WiFi, BT, Zigbee, UWB, AM/FM, and/or other D2D and sidelink protocols. The control signal and/or feedback signals utilizing the RF cable 1208 may be multiplexed via frequency division multiple access (FDMA) techniques. The wireless protocol transceivers 1252, 1254 may be components from different sources and/or manufacturers and thus may lower the cost of the digitally controlled antenna system 1250. Providing the signals over the RF cable 1208 may enable longer communication distances and thru more obstructions and may also reduce the power requirements as compared to utilizing OTA control signals.

Figure 13:
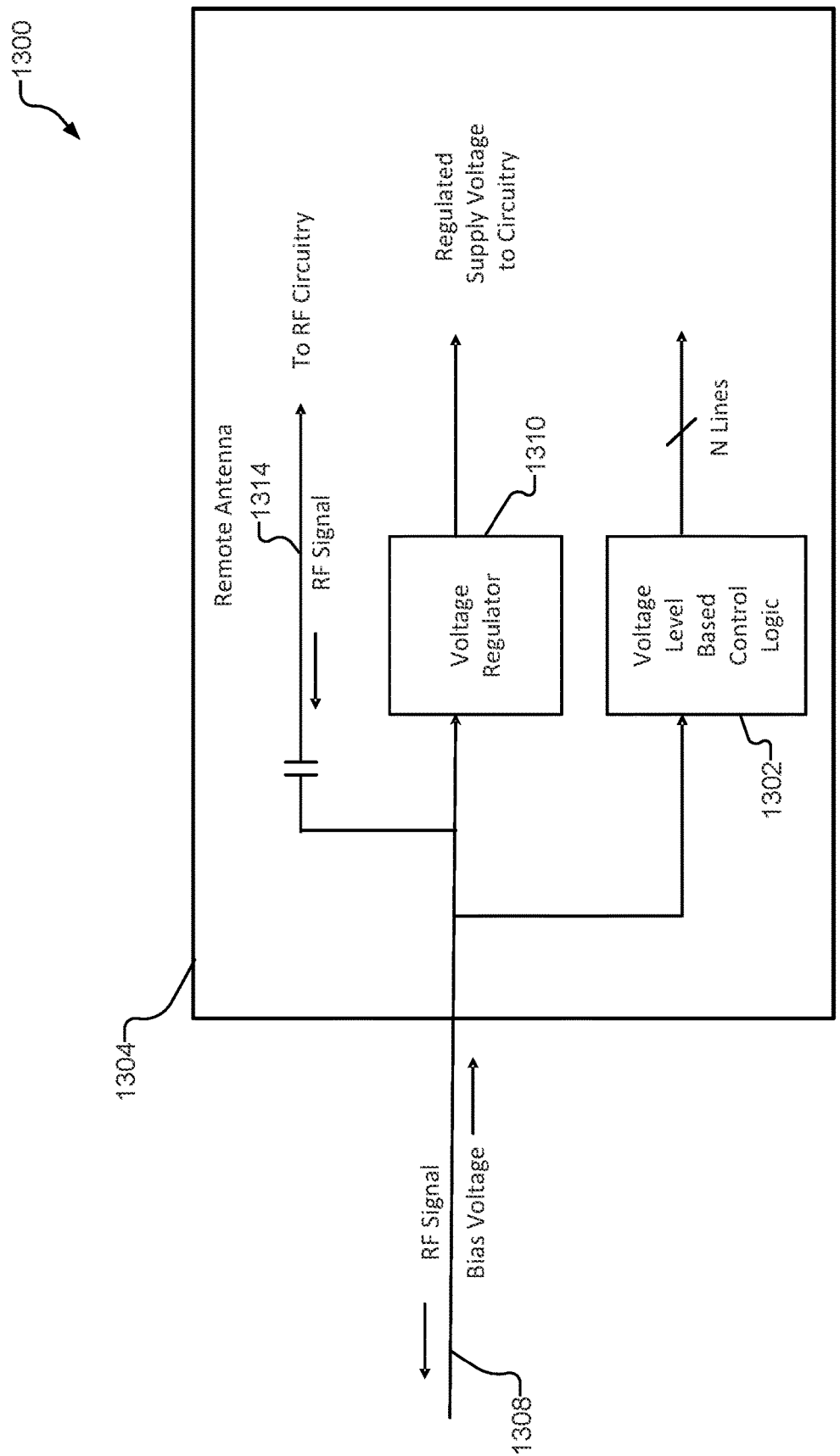
FIG. 13 is a block diagram of an example remote antenna system with a voltage regulator to reduce the impact of changing bias voltages.
Figure 14:
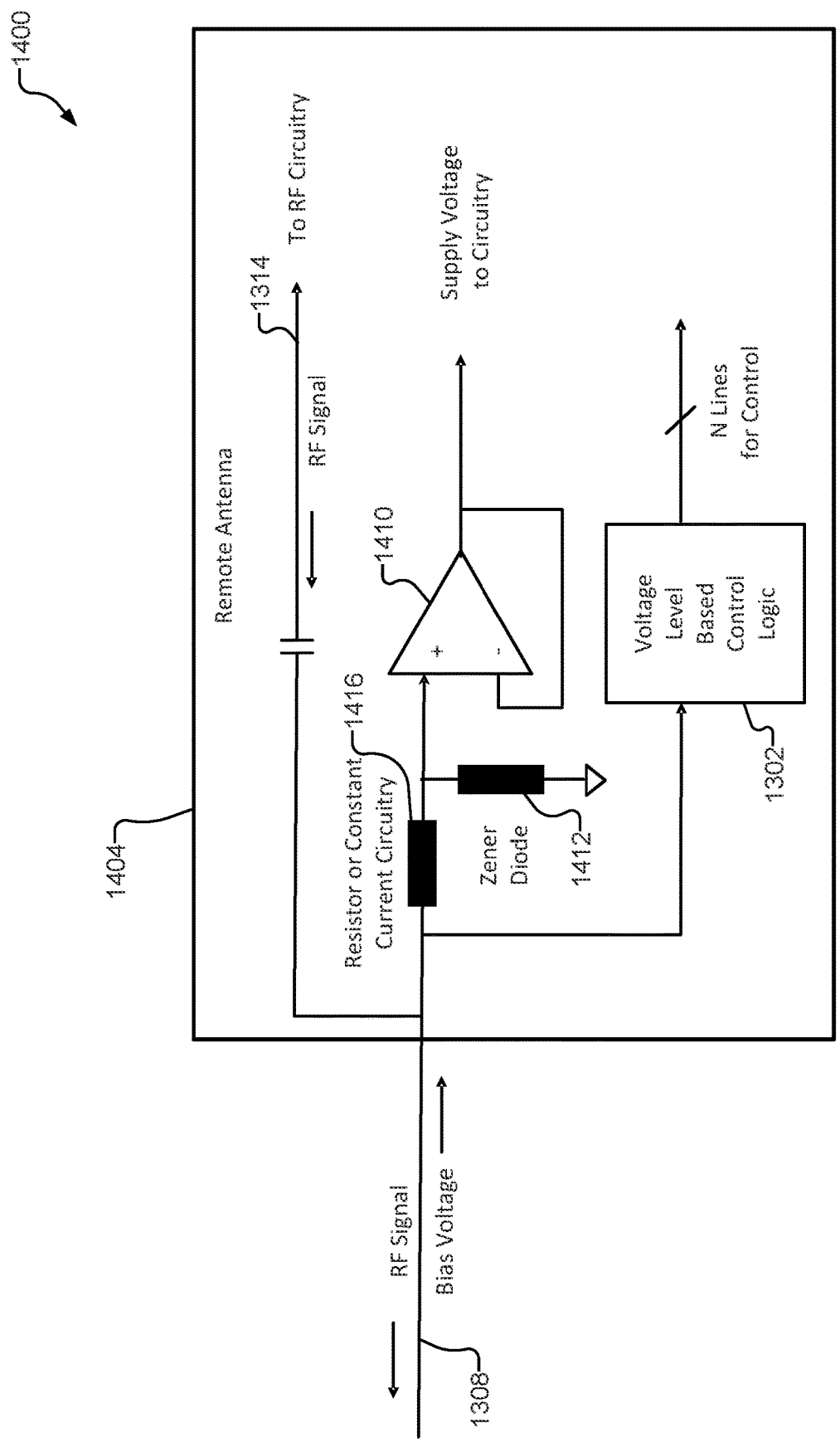
FIG. 14 is a block diagram of the remote antenna system utilizing Zener reference regulation to reduce the impact of changing bias voltages.

The use of bias voltage control signals over an RF cable between a receiver module and a remote antenna module may or may not require voltage regulation. In automotive applications, for example, antenna systems typically operate under a wide range of voltages (e.g., 3 to 21 volts). Voltage regulation may be required if the bias voltage transitions induce signal anomalies. In an example, referring to FIG. 13, a block diagram 1300 of an example antenna module 1304 with a voltage regulator 1310 to reduce the impact of changing bias voltage control is shown. Analog control signals, such as the bias voltage signal 1114, may be present on a coaxial cable 1308, and a voltage level based control logic module 1302, such as the comparators in the first example antenna module 1104 or the A2D converter in the second example antenna module 1154, is configured to generate control signals based on the bias voltage signal 1114. The voltage regulator 1310 is configured to provide a regulated supply voltage to the circuitry in the example antenna module 1304. RF signals 1314 may be isolated from the DC signal via capacitors (e.g., capacitive coupling), or other isolation techniques as known in the art. In an example, referring to FIG. 14, a block diagram 1400 of an example antenna module 1404 utilizing Zener reference regulation to reduce the impact of changing bias voltages is shown. A Zener regulation circuit including a Zener diode 1412, a resistor or constant current circuitry 1416, and a comparator 1410 may be used to supply a constant voltage to the antenna module 1404 when there is a bias voltage signal 1114 present on a coaxial cable 1308. Other voltage regulation techniques may also be used to reduce the impact of transitions in the bias voltage on the coaxial cable 1308.

Figure 15:
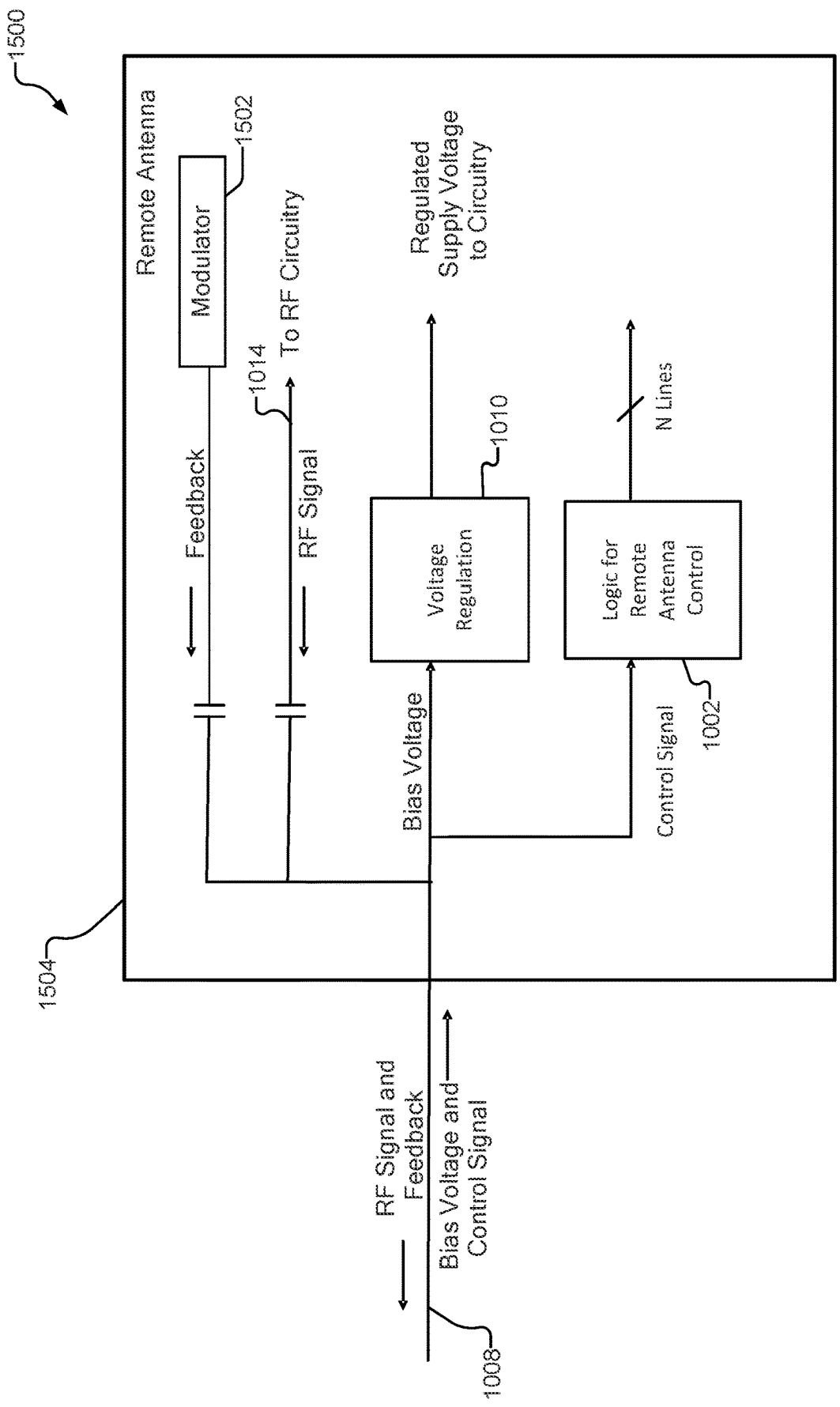
FIG. 15 is a block diagram of an example remote antenna module with a direct current bias voltage control signal and radio frequency modulated feedback information.

Referring to FIG. 15, with further reference to FIG. 10, a block diagram 1500 of an example antenna module 1504 with a control signal and radio frequency modulated feedback information is shown. The antenna module 1504 is an example of the remote antenna module 1004 with the addition of a modulator 1502 configured to modulate the RF signal 1014 provided to the remote processing unit, such as the vehicle module 506. The antenna module 1504 may also be based on the digital control example in the example digitally controlled antenna system 1200. The modulator 1502 may be configured to modulate the RF signal based on Amplitude Shift Keying (ASK), or other modulation techniques to encode feedback information received from the logic module 1002. The remote processing unit may be configured to demodulate the feedback information on the returning RF and modify control signals based on the feedback. Thus, the antenna module 1504 may utilize a single conductor 1008 (e.g., coaxial cable) for RF signals, as well as control signals, and receive feedback information (e.g., via modulation of the RF signal returning from the antenna module 1504).

Figure 16:
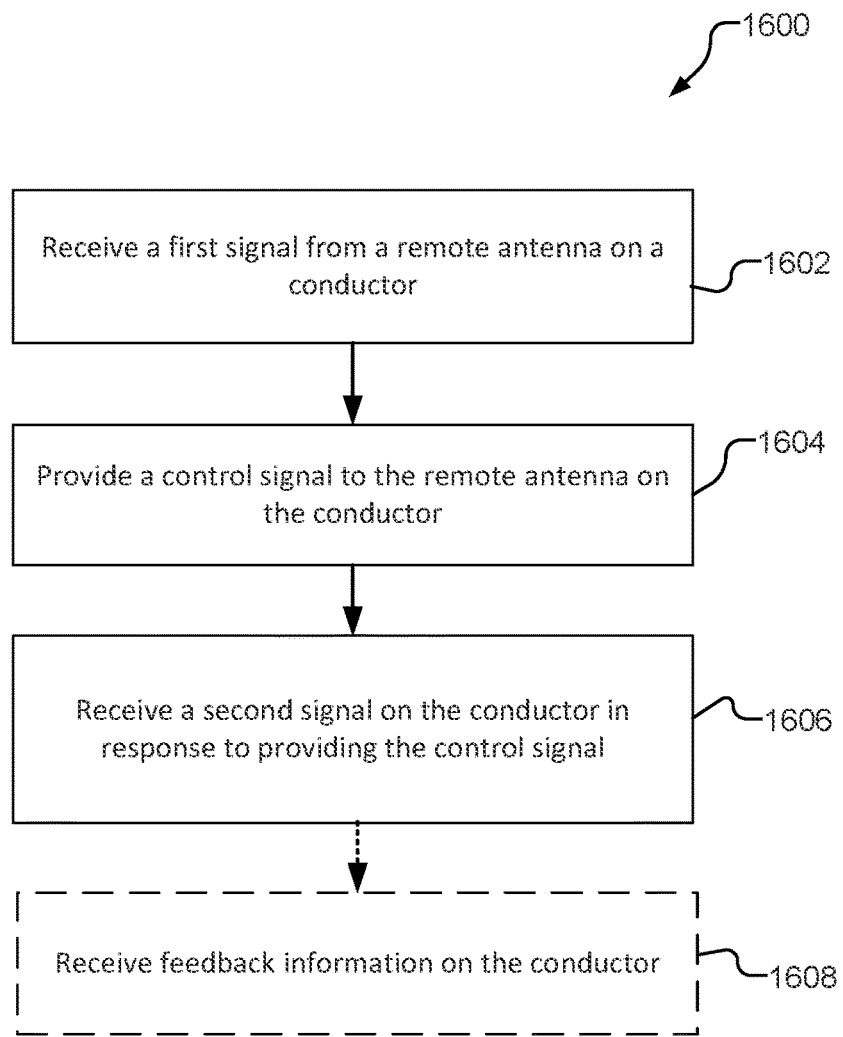
FIG. 16 is a process flow diagram of an example method for controlling a remote antenna module.

Referring to FIG. 16, with further reference to FIGS. 1-15, a method 1600 for controlling a remote antenna module includes the stages shown. The method 1600 is, however, an example and not limiting. The method 1600 may be altered, e.g., by having stages added, removed, rearranged, combined, performed concurrently, and/or having single stages split into multiple stages. For example, receiving a feedback signal at stage 1608 is optional.

At stage 1602, the method includes receiving a first signal from a remote antenna on a conductor. A processing module 606, including one or more transceiver modules, is a means for receiving the first signal from the remote antenna. In an example, the processing module 606 may include a GNSS receiver with a GNSS baseband processor, a WWAN processing module, and/or a WiFi processing module configured to receive signals from the remote antenna. The conductor may be a single wire, such as a center conductor of a coaxial cable. In an example, a coaxial cable may include a shield conductor electrically coupled to a system ground.

At stage 1604, the method includes providing a control signal to the remote antenna on the conductor. The processing module 606, including the second controller 620b, is a means for providing the control signal. In an example, the control signal may be multiplexed with other signals and provided to the remote antenna module via the conductor. In an example, the control signal may be a bias voltage signal 1114 provided by the second controller 620b to the conductor. In an example, the control signal may utilize the bias voltage to implement digital signaling techniques such as the digital control signal 1222 to provide the control signal on the conductor. In an example, referring to FIG. 12C, the control signal may be based on wireless protocols such as WiFi and BT and transmitted over the conductor.

At stage 1606, the method includes receiving a second signal on the conductor in response to providing the control signal. The processing module 606, including one or more transceiver modules, is a means for receiving the second signal from the remote antenna. The second signal may be based on changes to the antenna configuration caused by the control signal. For example, the first signal received at stage 1602 may be a cellular signal, and the second signal may be the cellular signal with a change in gain. The control signal may be used to vary the state of submodules and/or components in the remote antenna for various use cases as describe herein. The first signal is based on a first state of the remote antenna, and the second signal is based on a second state of the remote antenna.

At stage 1608, the method optionally includes receiving feedback information on the conductor. The processing module 606, including the second controller 620b, is a means for receiving the feedback information. In an example, referring to FIG. 15, the antenna module 1504 may be configure to modulate the RF signal (e.g., ASK) to provide the feedback information, and the processing module 606 may be configured to demodulate the RF signal to obtain the feedback information. In an example, the control signal provided at stage 1604 may be based on a bias voltage signal on the conductor, and the feedback information is modulation in the RF signal on the conductor.

Figure 17:
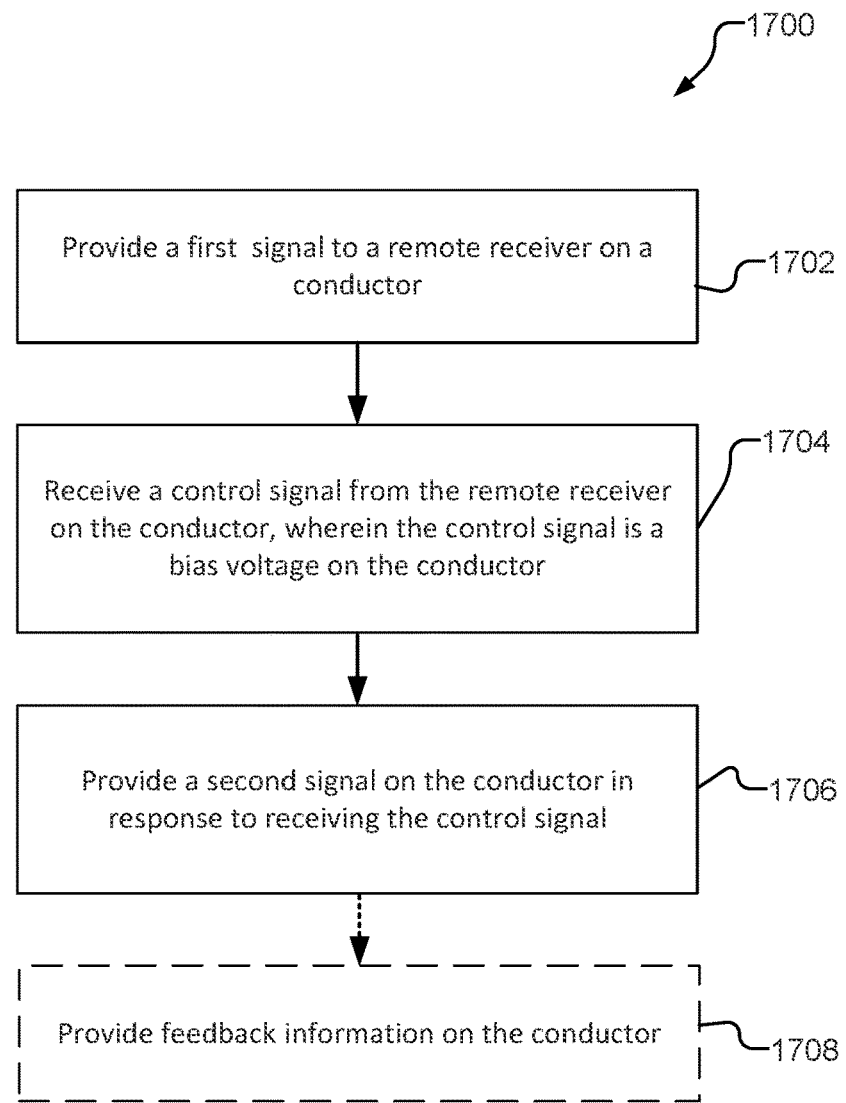
FIG. 17 is a process flow diagram of an example method for receiving control signals with a remote antenna module.

Referring to FIG. 17, with further reference to FIGS. 1-15, a method 1600 for receiving a control signal with a remote antenna module includes the stages shown. The method 1700 is, however, an example and not limiting. The method 1700 may be altered, e.g., by having stages added, removed, rearranged, combined, performed concurrently, and/or having single stages split into multiple stages. For example, providing a feedback signal at stage 1708 is optional.

At stage 1702, the method includes providing a first signal to a remote receiver on a conductor. An antenna module 604, including one or more submodules, is a means for providing the first signal. In an example, the antenna module 604 may include one or more submodules such as a GNSS submodule with one or more GNSS antennas, a WWAN submodule with one or more antenna arrays (e.g., to support MIMO), and a WLAN submodule configured to support other wireless signals such as WiFi and/or BT. The WWAN submodule and the WLAN submodule may include RFFE components such as embedded and discrete duplexers, diplexers, triplexers, extractors and bandpass, highpass, and lowpass filters. The first signal may include GNSS signals (e.g., in the L1, L2, L5 bands), a cellular signal (e.g., LTE, 5G NR) from the WWAN submodule, or a WiFi or BT signal from the WLAN submodule. The first signal may include other signals such as terrestrial and satellite radio signals received by other submodules in the antenna module 604. The single conductor may be a single wire, such as a center conductor of a coaxial cable. In an example, a coaxial cable may include a shield conductor electrically coupled to a system ground.

At stage 1704, the method includes receiving a control signal from the remote receiver on the conductor, wherein the control signal is a bias voltage on the conductor. The antenna module 604, including the first controller 620a, is a means for receiving the control signal. In an example, the control signal may be multiplexed with other RF signals and provided to the antenna module 604 via the conductor. The control signal may be a bias voltage signal 1114 provided by the second controller 620b in the processing module 606 to the conductor. The controller 620a may include a voltage comparator circuit or A2D circuits to provide control signals to the submodules. In an example, the control signal may utilize the bias voltage to implement digital signaling techniques such as the digital control signal 1222 to provide the control signal on the conductor. In an example, referring to FIG. 12C, the control signal may be based on wireless protocol such as WiFi and BT and transmitted over the conductor.

At stage 1706, the method includes providing a second radio signal on the conductor in response to receiving the control signal. The antenna module 604, including one or more submodules, is a means for providing the second radio frequency signal. The second signal may be based on changes to the one or more submodules caused by the control signal. For example, the first signal provided at stage 1702 may be a cellular signal, and the second signal may be the cellular signal with a change in gain, or received via a different antenna configuration (e.g., beam pattern, filter configuration, etc.). The control signal may be used to vary the state of submodules and/or components in the remote antenna for various use cases as describe herein. The first signal is based on a first state of the remote antenna, and the second signal is based on a second state of the remote antenna.

At stage 1708, the method optionally includes providing feedback information on the conductor. The antenna module 1504, including the second controller 620b, is a means for providing the feedback information. In an example, referring to FIG. 15, the remote antenna may be configure to modulate the RF signal (e.g., ASK) to provide the feedback information, and the processing module 606 may be configured to demodulate the RF signal to obtain the feedback information. In an example, the control signal received at stage 1704 may be based on a bias voltage signal on the conductor, and the feedback information is modulation in the RF signal on the conductor.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations will provide those skilled in the art with an enabling description for implementing described techniques. Various changes may be made in the function and arrangement of elements without departing from the scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the scope of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims. Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Unless otherwise indicated, "about" and/or "approximately" as used herein when referring to a measurable value such as an amount, a temporal duration, and the like, encompasses variations of ±20% or ≅10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A remote antenna module, comprising: one or more antenna submodules; a controller communicatively coupled to the one or more antenna submodules; and a conductor operably coupled to the one or more antenna submodules and the controller, wherein the conductor is configured to provide radio frequency signals from the one or more antenna submodules to a remote processing unit, and receive a control signal from the remote processing unit, wherein the control signal is based on a bias voltage value on the conductor.

Clause 2. The remote antenna module of clause 1 wherein the controller includes a plurality of comparators configured to detect the bias voltage value and a control circuit configured to provide a controller signal to at least one of the one or more antenna submodules based on the bias voltage value.

Clause 3. The remote antenna module of clause 1 wherein the controller includes an analog to digital converter circuit to detect the bias voltage value and a control circuit configured to provide a controller signal to at least one of the one or more antenna submodules based on the bias voltage value.

Clause 4. The remote antenna module of clause 1 wherein the controller is configured to vary a state of a low noise amplifier in at least one of the one or more antenna submodules based on the control signal.

Clause 5. The remote antenna module of clause 1 wherein the controller is configured to vary a state of a variable tuning element in at least one of the one or more antenna submodules based on the control signal.

Clause 6. The remote antenna module of clause 1 wherein the controller is configured to vary a state of a radio frequency filter in at least one of the one or more antenna submodules based on the control signal.

Clause 7. The remote antenna module of clause 1 wherein the controller is configured to vary a beam angle of an antenna array in at least one of the one or more antenna submodules based on the control signal.

Clause 8. The remote antenna module of clause 1 wherein the controller is configured to vary a physical orientation of an antenna in at least one of the one or more antenna submodules based on the control signal.

Clause 9. The remote antenna module of clause 1 further comprising a modulator communicatively coupled to the controller and configured to modulate the radio frequency signals from the one or more antenna submodules to provide a feedback signal to the remote processing unit.

Clause 10. The remote antenna module of clause 1 wherein the one or more antenna submodules includes at least one antenna and a filter circuit for a global navigation satellite system.

Clause 11. The remote antenna module of clause 1 wherein the one or more antenna submodules includes at least one antenna and a radio frequency front-end associated with a wireless wide area network.

Clause 12. The remote antenna module of clause 11 wherein the wireless wide area network is a cellular network.

Clause 13. The remote antenna module of clause 1 wherein the one or more antenna submodules includes at least one antenna and a radio frequency front-end associated with a wireless local area network.

Clause 14. The remote antenna module of clause 13 wherein the wireless local area network utilize a WiFi protocol.

Clause 15. The remote antenna module of clause 1 further comprising a multiplexer communicatively coupled to the one or more antenna submodules and the controller, wherein the multiplexer is configured to multiplex signals from the one or more antenna submodules and provide a synthesized signal to the remote processing unit.

Clause 16. The remote antenna module of clause 1 wherein the conductor is a center conductor in a coaxial cable.

Clause 17. A method of receiving radio frequency signals with a remote antenna module, comprising: providing a first signal to a remote receiver on a conductor; receiving a control signal from the remote receiver on the conductor, wherein the control signal is a bias voltage on the conductor; and providing a second signal on the conductor in response to receiving the control signal.

Clause 18. The method of clause 17 wherein the control signal is configured to vary a state of a low noise amplifier, wherein the first signal is based on a first state of the low noise amplifier and the second signal is based on a second state of the low noise amplifier.

Clause 19. The method of clause 17 wherein the control signal is configured to vary a state of a variable tuning element, wherein the first signal is based on a first state of the variable tuning element and the second signal is based on a second state of the variable tuning element.

Clause 20. The method of clause 17 wherein the control signal is configured to vary a state of a radio frequency filter, wherein the first signal is based on a first state of the radio frequency filter and the second signal is based on a second state of the radio frequency filter.

Clause 21. The method of clause 17 wherein the control signal is configured to vary a beam angle of an antenna array, wherein the first signal is based on a first beam angle and the second signal is based on a second beam angle.

Clause 22. The method of clause 17 wherein the control signal is configured to vary a physical orientation of an antenna, wherein the first signal is based on a first physical orientation and the second signal is based on a second physical orientation.

Clause 23. The method of clause 17 further comprising providing feedback information on the conductor.

Clause 24. An apparatus for receiving radio frequency signals, comprising: means for providing a first signal to a remote receiver on a conductor; means for receiving a control signal from the remote receiver on the conductor, wherein the control signal is a bias voltage on the conductor; and means for providing a second signal on the conductor in response to receiving the control signal.

Clause 25. The apparatus of clause 24 wherein the control signal is configured to vary a state of a low noise amplifier, wherein the first signal is based on a first state of the low noise amplifier and the second signal is based on a second state of the low noise amplifier.

Clause 26. The apparatus of clause 24 wherein the control signal is configured to vary a state of a variable tuning element, wherein the first signal is based on a first state of the variable tuning element and the second signal is based on a second state of the variable tuning element.

Clause 27. The apparatus of clause 24 wherein the control signal is configured to vary a state of a radio frequency filter, wherein the first signal is based on a first state of the radio frequency filter and the second signal is based on a second state of the radio frequency filter.

Clause 28. The apparatus of clause 24 wherein the control signal is configured to vary a beam angle of an antenna array, wherein the first signal is based on a first beam angle and the second signal is based on a second beam angle.

Clause 29. The apparatus of clause 24 further comprising means for providing feedback information on the conductor.

Clause 30. A non-transitory processor-readable storage medium comprising processor-readable instructions configured to cause one or more processors to receive radio frequency signals, comprising: code for providing a first signal to a remote receiver on a conductor; code for receiving a control signal from the remote receiver on the conductor, wherein the control signal is a bias voltage on the conductor; and code for providing a second signal on the conductor in response to receiving the control signal.

Clause 31. A remote antenna module, comprising: one or more antenna submodules; a controller communicatively coupled to the one or more antenna submodules; and a conductor operably coupled to the one or more antenna submodules and the controller, wherein the conductor is configured to provide radio frequency signals from the one or more antenna submodules to a remote processing unit, and receive a control signal from the remote processing unit.

Clause 32. The remote antenna module of clause 31 wherein the control signal is a bias voltage signal.

Clause 33. The remote antenna module of clause 32 wherein the controller includes a plurality of comparators configured to detect a bias voltage value and a control circuit configured to provide a control signal to at least one of the one or more antenna submodules based on the bias voltage value.

Clause 34. The remote antenna module of clause 32 wherein the controller includes an analog to digital converter circuit to detect a bias voltage value and a control circuit configured to provide a control signal to at least one of the one or more antenna submodules based on the bias voltage value.

Clause 35. The remote antenna module of clause 31 further comprising a wireless transceiver communicatively coupled to the controller and configured to receive the control signal via an over-the-air signal.

Clause 36. The remote antenna module of clause 31 further comprising a wireless transceiver communicatively coupled to the controller and the conductor, and configured to receive the control signal via the conductor.

Clause 37. A method of receiving radio frequency signals with a remote antenna module, comprising: providing a first radio frequency signal to a remote receiver on a conductor; receiving a control signal from the remote receiver on the conductor; and providing a second radio frequency signal on the conductor in response to receiving the control signal.

Clause 38. The method of clause 37 wherein the control signal is a bias voltage signal on the conductor.

Clause 39. The method of clause 37 wherein the control signal is based on a wireless local area network protocol transmitted on the conductor.

Clause 40. The method of clause 37 wherein the control signal is a digital signal on the conductor.

Clause 41. The method of clause 40 wherein the digital signal is an asynchronous receiver-transmitter protocol.

What is claimed is:

1. A remote antenna module, comprising:
   one or more antenna submodules, wherein the one or more antenna submodules includes at least one antenna and a filter circuit for a global navigation satellite system;
   a controller communicatively coupled to the one or more antenna submodules; and
   a single conductor operably coupled to the one or more antenna submodules and the controller, wherein the single conductor is configured and coupled to provide radio frequency signals from the one or more antenna submodules to a remote processing unit, and receive a control signal from the remote processing unit, wherein the control signal comprises a bias voltage value on the single conductor.

2. The remote antenna module of claim 1 wherein the controller includes a plurality of comparators configured to detect the bias voltage value and a control circuit configured to provide a controller signal to at least one of the one or more antenna submodules based on the bias voltage value.

3. The remote antenna module of claim 1 wherein the controller includes an analog to digital converter circuit to detect the bias voltage value and a control circuit configured to provide a controller signal to at least one of the one or more antenna submodules based on the bias voltage value.

4. The remote antenna module of claim 1 wherein the controller is configured to vary a state of a low noise amplifier in at least one of the one or more antenna submodules based on the control signal.

5. The remote antenna module of claim 1 wherein the controller is configured to vary a state of a variable tuning element in at least one of the one or more antenna submodules based on the control signal.

6. The remote antenna module of claim 1 wherein the controller is configured to vary a state of a radio frequency filter in at least one of the one or more antenna submodules based on the control signal.

7. The remote antenna module of claim 1 wherein the controller is configured to vary a beam angle of an antenna array in at least one of the one or more antenna submodules based on the control signal.

8. The remote antenna module of claim 1 wherein the controller is configured to vary a physical orientation of an antenna in at least one of the one or more antenna submodules based on the control signal.

9. The remote antenna module of claim 1 further comprising a modulator communicatively coupled to the controller and configured to modulate the radio frequency signals from the one or more antenna submodules to provide a feedback signal to the remote processing unit.

10. The remote antenna module of claim 1 wherein the one or more antenna submodules includes at least one antenna and a radio frequency front-end associated with a wireless wide area network.

11. The remote antenna module of claim 10 wherein the wireless wide area network is a cellular network.

12. The remote antenna module of claim 1 wherein the one or more antenna submodules includes at least one antenna and a radio frequency front-end associated with a wireless local area network.

13. The remote antenna module of claim 12 wherein the wireless local area network utilize a WiFi protocol.

14. The remote antenna module of claim 1 further comprising a multiplexer communicatively coupled to the one or more antenna submodules and the controller, wherein the multiplexer is configured to multiplex signals from the one or more antenna submodules and provide a synthesized signal to the remote processing unit.

15. The remote antenna module of claim 1 wherein the one or more antenna submodules is capacitively coupled to the single conductor.

* * * * *